United States Patent [19]

Stewart

[11] Patent Number: 4,728,784

[45] Date of Patent: Mar. 1, 1988

[54] APPARATUS AND METHOD OF ENCODING AND DECODING BARCODES

[75] Inventor: Stephen R. Stewart, Lakeland, Tenn.

[73] Assignee: Federal Express Corporation, Memphis, Tenn.

[21] Appl. No.: 9,203

[22] Filed: Jan. 30, 1987

[51] Int. Cl.$^4$ .............................................. G06K 7/10
[52] U.S. Cl. ..................................... 235/462; 235/436; 235/466; 235/463; 235/472; 235/487
[58] Field of Search ............... 235/436, 466, 462, 463, 235/487, 472

[56] References Cited

U.S. PATENT DOCUMENTS

| | | |
|---|---|---|
| 3,528,059 | 9/1970 | Spanjersberg . |
| 3,648,838 | 3/1972 | Hiromura . |
| 3,757,942 | 9/1973 | Gunn . |
| 3,774,758 | 11/1973 | Sternberg . |
| 3,778,597 | 12/1973 | Vanderpool et al. ............... 235/463 |
| 3,783,246 | 1/1974 | Bayer . |
| 3,887,793 | 6/1976 | Goodfinger et al. ............... 235/436 |
| 4,087,681 | 5/1978 | Spencer et al. ..................... 235/466 |
| 4,146,782 | 3/1979 | Barnich . |
| 4,528,444 | 7/1985 | Hara et al. . |
| 4,542,528 | 9/1985 | Sanner et al. . |
| 4,570,057 | 2/1986 | Chadima, Jr. et al. . |
| 4,578,570 | 3/1986 | Mazumder et al. ............ 235/466 X |
| 4,578,571 | 3/1986 | Williams . |
| 4,687,912 | 8/1987 | Ohta .................................... 235/463 |

Primary Examiner—David L. Trafton
Attorney, Agent, or Firm—Finnegan, Henderson, Farabow, Garrett & Dunner

[57] ABSTRACT

A method and system for reading encoded information from conventional bar codes and from hand-encoded barcodes is provided. The method and system include processing which eliminates false spaces and bars in conventional pre-encoded printed barcode formats as well as those in hand-encoded barcode formats. A preprinted barcode form containing a plurality of bars and spaces representing the elements of a character code is used in which at least one of the bars is designed to be modified by hand to represent the encoded character. A barcode reader system scans the barcode and processes the scanned barcode symbol into decoded form. A barcode label for encoding a multi-character string readable by a barcode reader is also provided which includes a plurality of data lines which contains barcode readable start and stop codes unique to each data line and a barcode readable digit form located between the start and stop code of each data line.

30 Claims, 19 Drawing Figures

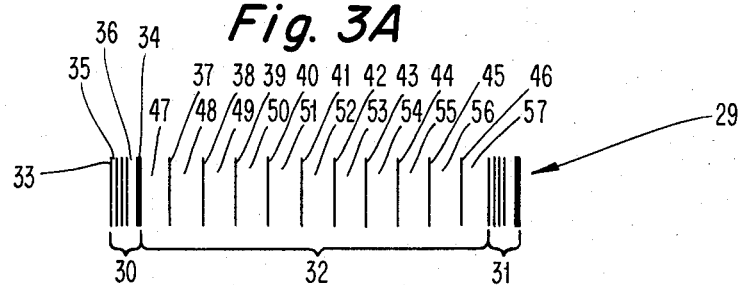
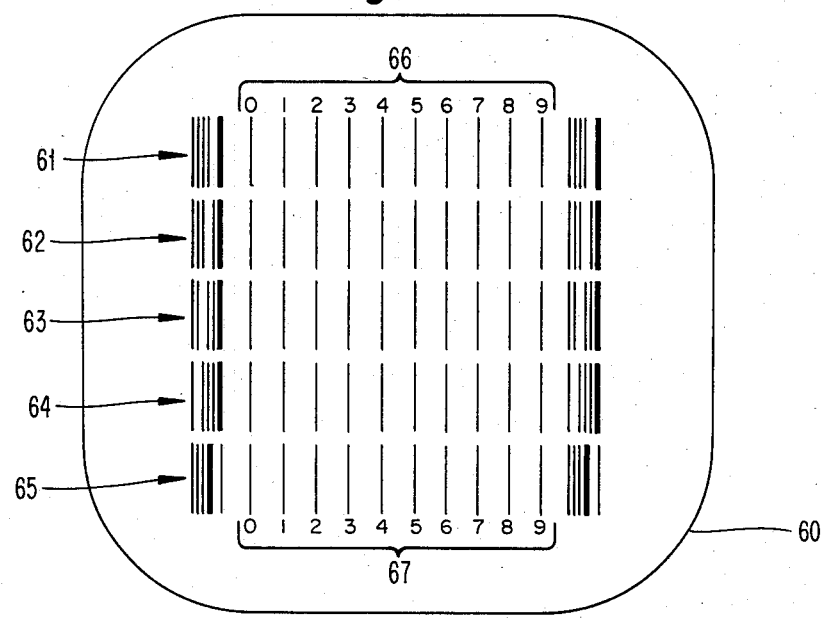
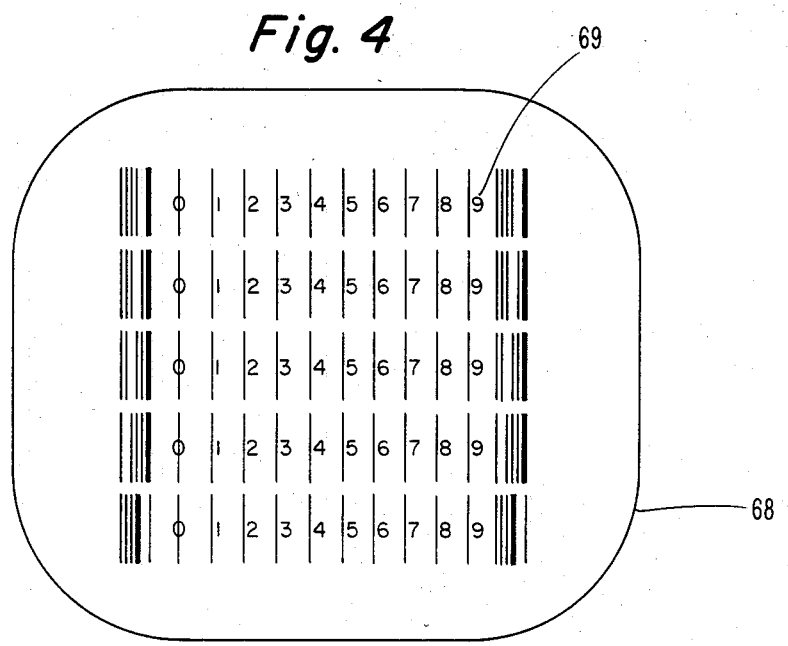

APPARATUS AND METHOD OF ENCODING AND DECODING BARCODES

BACKGROUND OF THE INVENTION

1. Field Of The Invention

This invention relates generally to the field of barcode reading systems and, more specifically, to a barcode reader which accurately reads coding from conventionally printed barcodes and coding from hand-encoded barcodes.

2. Description Of Related Art

Barcodes and their associated reading systems are widely known and used to facilitate manufacturing, shipment and inventory control of diverse goods, to assist in document control, and to aid in many additional tasks. Various barcode reading and laser scanning systems have been developed to scan and decode standard barcode formats and to generate digit representations to be used as inputs, typically, to computers for automatic processing and the like. Conventional barcode reading systems are discussed, for example, in U.S. Pat. No. 4,146,782 to Barnich; U.S. Pat. No. 4,542,528 to Sanner et al.; and U.S. Pat. No. 4,578,571 to Williams.

A number of barcode reading systems are readily available on the market. For example, the following barcode reading systems are, among others, currently available: Epson HX20 by Epson America of Torrance, Calif.; Microwand II by Hand Held Products of Charlotte, N.C.; and Intermec 9400 by Intermec of Seattle, Wash. Each of these barcode reading systems is programmable to read and decode a number of the existing, pre-printed, pre-encoded barcode formats such as UPC, Codabar, and Code 39.

These conventional barcode reading systems scan and read the printed barcode formats and decode the elements (that is, the bars and spaces) of the barcode formats as well known in the art. A typical printed barcode is illustrated in FIG. 1A. In FIG. 1A the printed, pre-encoded barcode 10 is made up of elements 40 consisting of a number bars of varing widths, for example, bars 11, 12, 13, and a number of spaces of varying widths, such as spaces 14, 15, 16, prearranged to represent a string of digits in a known, encoded form. A barcode reading system can be used to scan along a scan track, such as track 17, and read that encoded form. Typically, the scan can be made in either direction.

The conventional reading systems are confined, however, to reading only pre-encoded barcode formats which have been precisely printed as a barcode label. The pre-printed label must contain a predetermined, standard barcode format pattern which is recognizable by the barcode reading systems. Furthermore, the conventional reading systems are susceptible to generating false readings (that is, either a false character or no character at all) if the barcode pattern detected does not fit the precise pattern of known barcode formats. Such false readings can be caused by an imprecisely printed barcode which contains false elements. These false elements are created by extraneous markings, such as an ink spot or a fleck of dirt in a space of the barcode, and by extraneous voids, such as an unintentional void or space in a bar of the barcode. In FIG. 1B the typical printed barcode 10 of FIG. 1A has been modified to show in exaggerated form an extraneous mark 18 in space 14 and an extraneous void 19 in bar 12. If either or both of the extraneous mark and void are detected during a scan by a barcode reader along scan track 17, the conventional barcode reading system will attempt to process the extraneous bars and spaces. That attempt, typically, will result in a false reading or no reading whatsoever of barcode 10.

Being limited to the precisely configured barcode formats readily recognizable by the reading system, the conventional barcode reading systems require barcode formats which must be carefully pre-printed. For accurate reading of the coded information by the conventional systems, these printed, pre-encoded labels must be free from extraneous marks and voids. Furthermore, these systems do not allow the use of a barcode which can be easily marked by the user to contain desired encoded information.

A barcode that is designed to be easily modified by hand to contain valid data using readily available marking equipment, such as pens and pencils, and which can be accurately read by humans and by barcode reading systems would be most useful and have a wide variety of applications. For example, hand-marking or hand-encoding of such a barcode would allow the quick encoding of a variety of data which can be subsequently read by a barcode reading system and verified by the system. The hand-encoded data, once read, can be used as input to computers for automatic processing and the like in the same manner as conventional pre-printed barcodes. For example, a hand-encoded barcode system would be useful for encoding, verifying, and using ZIP Codes ®, part numbers, account numbers, and other identification numbers. The hand-encoded barcode system would also be useful for recording and processing survey data, test scores, statistics, and other data. Such a system would be useful in any situation where it is desirable to have a human encode a character or string of characters onto a document, label, package, or the like, which character or string can be easily and accurately identified by humans and by machine for verification and further processing.

While hand-marked, machine readable labels are well known, those labels are not barcode labels. Rather, the known hand-marked labels, often referred to as mark-sense labels, operate in a manner quite different from barcodes. Specifically, the hand-marked material on the mark-sense label is not read and decoded itself; only the relative position of the marking on the label is read and that physical position is then translated into the desired information. In order to obtain accurate decoding of the hand-marked matter, the mark-sense labeling system requires flat sheets of uniform size paper and precise location of the paper within the optical reader so that the relative location of the marking on the sheet can be determined with accuracy for proper translation. Various mark-sense type hand-marked labeling systems are discussed in U.S. Pat. No. 3,528,059 to Spanjersberg, U.S. Pat. No. 3,648,838 to Hiromura, U.S. Pat. No. 3,774,758 to Sternberg, and U.S. Pat. No. 3,783,246 to Bayer.

From the foregoing considerations, it should be apparent that there is a need for an improved barcode reading system in which false readings due to extraneous markings and voids in the barcode are eliminated from the reading of conventional, printed, pre-encoded barcodes. It should also be apparent that there is a need for a barcode that can be easily modified by the user using conventional marking equipment, such as pens, pencils, and the like, to encode a character or string of characters on the barcode and that the hand-encoded barcode be accurately read and decoded by barcode reading systems. Futhermore, it should be apparent that there is a need for a hand-encodable barcode for encoding data on a document or label by a user which encoded data is readable by humans as well as by a wide variety of barcode reading systems. There is also a need for such a barcode system in which the position of the hand-encoded information on the document or label need not be precisely made with reference to any particular physical position on the document or label itself.

It is, thus, intended that the invention provide a method and system for accurately reading encoded information on a barcode.

Another intent is that the invention provide a method and system for reading a barcode and detecting and eliminating false elements from the barcode for accurate decoding of the encoded information on the barcode.

Still another intent is that the invention provide a method and system for easily encoding information on a blank barcode form and accurately reading the encoded information from the marked barcode form by human vision and by barcode reading systems.

Yet another intent is that the invention provide a method and system for reading an encoded string of characters from a plurality of barcodes positioned in a regular order where each barcode represents an encoded character in the string of characters.

It is also intended that the invention provide a barcode label for encoding a string of characters readable by a barcode reading system with accuracy.

Other intentions and features of the invention will further become apparent with reference to the accompanying drawings and the detailed description of the invention or may be learned by practice of the invention.

SUMMARY OF THE INVENTION

To achieve the foregoing intentions and in accordance with the purpose of the invention as embodied and broadly described herein, a method for reading encoded information from a barcode is provided. The method comprises the steps of reading the barcode using a barcode reader to capture data for forming a complete image timing sample of the barcode; generating in a barcode processor the complete image timing sample from the data captured by the barcode reader, the complete image timing sample representing the read barcode including the number of elements in the barcode, whether the element is a bar or a space, and the width of each element; and processing the complete image timing sample in the barcode processor which processing step includes the substeps of identifying false elements in the complete image timing sample, filtering the false elements from the complete image timing sample, and processing the filtered complete image timing sample to decode the encoded information contained in the elements of the filtered complete image timing sample.

In a preferred method, the substep of identifying false elements in the complete image timing sample includes the step of determining in the barcode processor the false spaces in the complete image timing sample; and the substep of filtering the false elements from the complete image timing sample includes the step of filtering in the barcode processor the false spaces from the complete image timing sample. The substep of filtering from the complete image timing sample the false spaces can further include the following step for each false space: combining in the barcode processor the width of the false space with the width of the bar following the false space and the width of the bar preceding the false space.

Also provided is a method for entering information into a processor using a barcode containing a pre-printed form composed of a digit code having digit bars and digit spaces. The method comprises the steps of modifying a digit bar of the digit code to represent a portion of the information to be entered; reading the barcode with the modified digit bar using a barcode reader to capture data for forming a complete image timing sample of the barcode; generating in a barcode processor the complete image timing sample from the data captured by the barcode reader, the complete image timing sample representing the read barcode; determining in the barcode processor a total number of elements in the complete image timing sample; comparing in the barcode processor the total number of elements in the complete image timing sample with a desired number of elements for the barcode; and processing the complete image timing sample in the barcode processor to detect the modified digit bar and to decode the information contained in the elements of the complete image timing sample if the number of elements in the complete image timing sample equals a desired number. If the number of elements in the complete image timing sample is greater than the desired number, the method includes the processing of the complete image timing sample in the barcode processor. The processing step includes the substeps of identifying false elements in the complete image timing sample, filtering the false elements from the complete image timing sample, and processing the filtered complete image timing sample to decode the information contained in the elements of the filtered complete image timing sample.

Additionally, a method is provided for reading an encoded string of characters from a plurality of barcodes arranged in a regular order, each barcode including encoded information representing an encoded character in a string of characters. The method comprises the steps of reading with a barcode reader each of the plurality of barcodes; transmitting the read barcodes to a barcode processor; extracting encoded position information from each barcode using the barcode processor, the encoded position information representing a position within the string of characters being decoded of the character encoded in the corresponding barcode; extracting encoded character information from each read barcode using the barcode processor and decoding a character from the encoded character information; and generating, using the barcode processor, a decoded string of characters from the extracted position information and decoded character of the read barcodes.

A barcode label for encoding a multi-character string readable by a barcode reader is also provided. The label comprises a plurality of data lines; barcode readable start and stop codes unique to each data line; and a barcode readable digit form located between the start code and a stop code of each data line. In a preferred embodiment, the start code of a data line is identical to the stop code of that data line. Futhermore, the digit form of the barcode label includes a plurality of digit bars and digit spaces, each digit space being wider than a digit bar and each digit bar being bounded on each side by a digit space. The barcode label provided here also includes the start, stop, and digit bars as pre-printed indicia on the barcode label.

A system for entering into a processor a character marked by hand is also provided. The system comprises a pre-printed barcode form containing a plurality of bars and spaces representing the elements of a character code, of which at least one of the bars is designed to be modified by hand to represent the character; barcode reader means for scanning the barcode form with the at least one modified bar and capturing data for forming a complete image timing sample representing the bars, spaces, and at least one modified bar; and means, coupled to the barcode reader means, for generating from the data captured by the barcode reader means the complete image timing sample and for processing it to distinguish modified bars from unmodified bars and for decoding the modified bars into corresponding characters. In a preferred embodiment, the processing means of the system includes means for determining a total number of elements in the complete image timing sample, comparing the total number of elements in the complete image timing sample with a desired number of elements, detecting any false elements in the complete image timing sample, filtering from the complete image timing sample the false elements and decoding the elements of the filtered complete image timing sample to obtain the characters.

BRIEF DESCRIPTION OF THE DRAWINGS

The accompanying drawings, which are incorporated in and constitute part of the specification, illustrate embodiments and methods of the invention and, together with the description, serve to explain the principles of the invention.

Of the drawings:

FIG. 3A is an illustration of a single, blank, hand-encodable barcode symbol according to a preferred embodiment of the invention;

FIG. 3B is a diagrammatic illustration of a blank pre-printed barcode label containing five of the single, blank, hand-encodable barcode symbols of FIG. 3A according to a preferred embodiment of the invention;

FIG. 4 is a diagrammatic illustration of a blank pre-printed barcode label according to another preferred embodiment of the invention;

Reference will now be made in detail to the present preferred embodiments and methods of the invention, examples of which are illustrated in the accompanying drawings.

DESCRIPTION OF THE PREFERRED EMBODIMENTS AND METHODS

Figure 2:
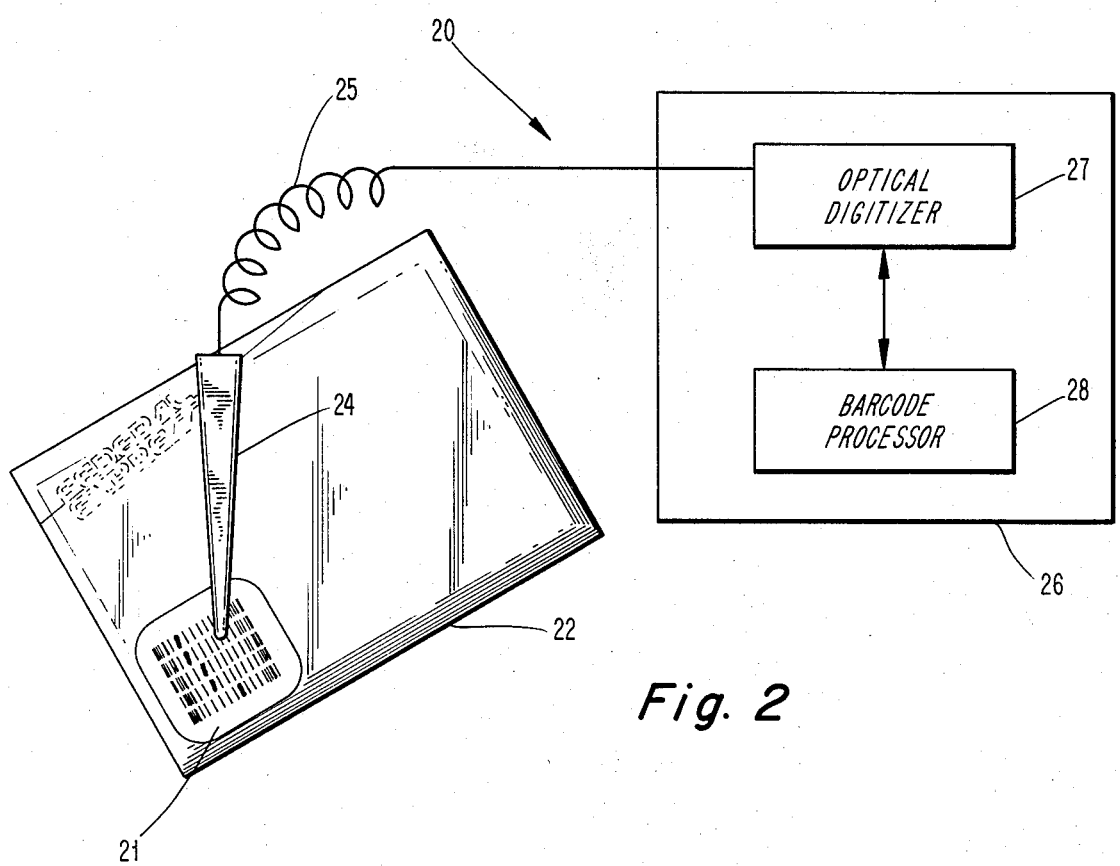
FIG. 2 is a block diagram of a barcode reading system according to a preferred embodiment of the invention.

Referring again to the drawings, wherein like reference characters designate like or corresponding parts throughout the several drawings, there is shown in FIG. 2 the barcode reading system according to a preferred embodiment of the present invention. As shown in FIG. 2, a preferred embodiment of the invention includes a barcode reading system 20 having a barcode label 21 and a barcode reader 24 connected to a signal processor 26. Barcode label 21 shows the pre-printed barcode label already modified to represent an encoded string of characters as is discussed in detail below. Barcode label 21 can, for example, be a pre-printed blank barcode label readily affixable to a package, such as overnight package 22. The blank label can be modified by the user to include an encoded character or string of characters before or after the label is affixed to the package. The blank barcode label can also be printed directly on the package for subsequent modification to indicate the encoded character or string of characters.

As illustrated in FIG. 2, the barcode reader means of the present invention for scanning the marked barcode label and capturing a complete image timing sample representing the elements of the barcode can be, in a preferred embodiment, a barcode reader 24, such as a barcode wand, which is connected by transmission line 25 to signal processor 26. The complete image timing sample of a barcode is the bar and space time durations of each bar and space detected. From that timing sample, data can be generated for not only the width of each detected element but also the number and type (bar or space) of the elements detected.

The means for generating and processing the complete image timing sample of the read barcode label for decoding that label of the present invention is, in the preferred embodiment of FIG. 2, signal processor 26 which includes an optical digitizer 27 coupled to barcode reader 24 and coupled to a barcode processor 28. The optical digitizer converts the analog signals received from the barcode reader into digital signals in a conventional manner which are then fed to the barcode processor.

The present invention is not, of course, limited to a barcode wand-type barcode reader. It may include well known laser beam systems and non-contact scanners. Furthermore, the barcode reading system may be a portable system or a fixed system as well known in the art.

Barcode reading system 20 is used to scan the barcode label and process the encoded information on the label. From the user's standpoint, the operation of barcode reader 24 and signal processor 26 is identical to that of a conventional barcode reading system which is reading a conventional barcode format.

Barcode reader 24 with signal processor 28 is a programmable type of barcode reading system known and readily available on the market. In the known programmable type of system, a number of which are discussed above, the program of the barcode processor is modified in accordance with the present invention to allow the accurate reading of hand-encoded barcode labels and the accurate reading of conventional barcode labels. The details of the specific manner of processing is discussed below with reference to FIGS. 8-12. These conventional barcode reading systems include processing capabilities to compensate for acceleration and deceleration of scan speeds and to allow reading of curved and irregularly shaped labels. These capabilities are also enjoyed by the present invention.

To distinguish the hand-modifiable, hand-encodable barcode of the present system from conventional printed, pre-encoded barcode formats, the barcode format of the present invention will be designated a "Zodecode" TM symbol. The details of a single, unmarked Zodecode symbol, according to a preferred embodiment of the invention, are shown in FIG. 3A. Each Zodecode symbol begins with a start code, ends with a stop code and contains a digit code portion between the start and stop code. For example, in FIG. 3A, the single, unmarked or blank Zodecode symbol 29 contains a start code 30, a stop code 31, and a digit code portion or form 32. The details of these parts of a Zodecode symbol are discussed below.

Illustrated in FIG. 3B is a blank or unmarked pre-printed barcode label 60, called a Zodecode label, consisting of five separate data lines 61, 62, 63, 64, 65. Each data line is one unmarked Zodecode symbol of the type shown in FIG. 3A with its own, unique start and stop codes. As shown in the preferred embodiment of FIG. 3B, each Zodecode symbol accommodates ten characters, such as digits 0-9, in its digit code portion, and there are five Zodecode symbols arranged in a regular order to make up Zodecode label 60. However, the present invention is not limited to a Zodecode symbol having ten character positions in its digit code portion nor to a Zodecode label having five data lines. For the sake of simplicity, the description here is directed, however, to the specific embodiment illustrated in FIG. 3B. Furthermore, again for simplicity, the description here is given with reference to a single character being marked in the digit code portion of a Zodecode symbol. A person of ordinary skill in the art, utilizing this disclosure, can readily modify the disclosed reading system, method, and label to accommodate applications other than the specific application described below which concerns a five digit number as the hand-encoded information.

The Zodecode symbol shown in FIG. 3A and each of those on the blank pre-printed barcode label 60 of FIG. 3B includes a number of bars and spaces representing the elements of the Zodecode symbol. In the specific embodiment illustrated in FIGS. 3A and 3B, the start and stop codes each consist of a pattern of four narrow bars, one wide bar, and intervening spaces. The intervening spaces consist of four narrow spaces and one wide space. In FIG. 3A and in the enlarged portion of that Zodecode symbol shown in FIG. 7A, a narrow bar of start code 30 is bar 33, a wide bar is bar 34, one of the four narrow spaces is space 35, and the wide space is space 36.

The combination of wide and narrow bars and spaces encode a single digit from "0" to "9", for example, that can be read and processed by barcode reader 24 and signal processor 26 to identify which Zodecode symbol was scanned. This aids processing and eliminates errors when several Zodecode symbols are used near each other to encode a series of characters such as on Zodecode label 60 when hand-encoded. Each start code is pre-printed with encoded position information which not only identifies the data line and, thus, the specific Zodecode symbol of the Zodecode label, but also the position of the encoded character of that data line within the string of characters being decoded from the Zodecode label. Table 1 below sets forth a convenient series of Zodecode stop/stop codes.

TABLE 1

START/STOP CODE TABLE
(0 = NARROW; 1 = WIDE)

| START/STOP CHARACTER | BAR PATTERN OVER SPACE PATTERN | |
|---|---|---|
| | FORWARD DIRECTION | REVERSE DIRECTION |
| 1 | 0 0 0 0 1<br>0 0 0 1 | 1 0 0 0 0<br>1 0 0 0 0 |
| 2 | 0 0 0 0 1<br>0 0 1 0 | 1 0 0 0 0<br>0 1 0 0 |
| 3 | 0 0 0 0 1<br>0 1 0 0 | 1 0 0 0 0<br>0 0 1 0 |
| 4 | 0 0 0 0 1<br>1 0 0 0 | 1 0 0 0 0<br>0 0 0 1 |
| 5 | 0 0 0 1 0<br>0 0 0 1 | 0 1 0 0 0<br>1 0 0 0 |
| 6 | 0 0 0 1 0<br>0 0 1 0 | 0 1 0 0 0<br>0 1 0 0 |
| 7 | 0 0 0 1 0<br>0 1 0 0 | 0 1 0 0 0<br>0 0 1 0 |
| 8 | 0 0 0 1 0<br>1 0 0 0 | 0 1 0 0 0<br>0 0 0 1 |
| 9 | 0 0 1 0 0<br>0 0 0 1 | 0 0 1 0 0<br>1 0 0 0 |
| 0 | 0 0 1 0 0<br>0 0 1 0 | 0 0 1 0 0<br>0 1 0 0 |

As shown in FIG. 3B and in Table 1, the pattern used for a stop code exactly matches the pattern used for the start code of the same Zodecode symbol. As will become apparent from the discussion below, signal processor 26 is programmed to utilize the matching of the start and stop codes for each Zodecode symbol. Specifically, the matching requirement is used by the signal processor to prevent accidental scanning and reading of the first part of one Zodecode symbol and the last part of an adjacent Zodecode symbol when the symbols are stacked one on top of another as the data lines 61-65 shown in FIG. 3B. The start and stop signals are also designed to support scanning of the Zodecode symbol in either direction, forward or reverse. Further, the reverse version of any start code is not allowed to be used as a normal start code to eliminate starts at the wrong end of the Zodecode symbol and in the incorrect direction. This allows signal processor 26 to determine quickly which direction the Zodecode symbol is being scanned so that the signal processor can correctly interpret the digit code portion of the Zodecode symbol as discussed below.

The blank or unmarked digit code portion or digit form of a Zodecode symbol in the preferred embodiment illustrated in FIGS. 3A and 3B consists of 10 narrow digit bars, each of which is bounded on each side by a wide digit space. For example, in the Zodecode symbol 29 in FIG. 3A, the ten digit bars are indicated as elements 37 through 46, and the digit spaces are designated 47 through 57.

Each digit bar of each Zodecode symbol is interpreted as a separate character and, typically, can be interpreted as a digit. As discussed above, the preferred embodiment disclosed here concerns the application in which only one of ten bars will be marked into a wider bar for encoding and subsequent decoding. As mentioned, the signal processor can be modified to allow more than one of the bars to be marked for special applications and the number of digit bars can be greater than or less than the ten shown in FIG. 3A. In special applications where multiple digit bars are hand-encoded, the only restriction is that the system cannot distinguish between a Zodecode symbol with no digit bars marked and one with all digit bars marked.

Figure 5:
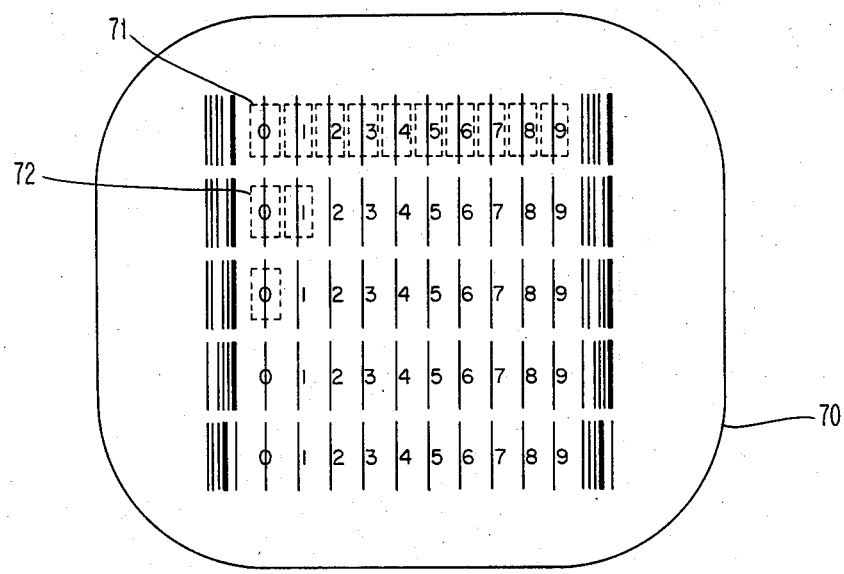
FIG. 5 is a diagrammatic illustration of a blank pre-printed barcode label according to yet another preferred embodiment of the invention.

Zodecode label 60 can also include marking indicia to designate to the Zodecode symbol user what information the separate digit bars represent. For example, in FIG. 3B, marking indicia 66, 67 are added to the label at the top of data line 61 and below the data line 65, respectively. Other marking indicia can be utilized as shown in FIGS. 4 and 5. In FIG. 4, the marking indicia, for example, indicia 69, are placed on or near their corresponding digit bars for each of the Zodecode symbols of Zodecode label 68. In FIG. 5, additional marking indicia is included on barcode label 70 to aid the user in marking the appropriate digit bar. As illustrated in FIG. 5, box-like outlines, for example, outlines 71 and 72, can be added to the Zodecode label to indicate the area to be marked by the user for each digit bar. Only a portion of the outlines are actually shown in FIG. 5.

The bars at the start and stop codes and the digit bars of the digit code portion of each Zodecode symbol are printed in an ink, usually black, that the barcode reader can detect. The marking indicia, on the other hand, must be printed in a color invisible to the barcode reader if the marking indicia is printed in the area which will be scanned by the barcode reader. For example, the marking indicia illustrated in FIG. 4 is in the scanning area and, therefore, must be invisible to the barcode reader. Similarly, the marking indicia and in FIG. 5 including the box-like outlines 71 and 72 are in the scanning area and must be invisible to the barcode reader. However, marking indicia 66, 67 shown on the Zodecode label in FIG. 3B are outside of the scanning area and can, therefore, be printed in a color visible to the barcode reader if desired. In a preferred embodiment of the invention, a visible red barcode reader is used. With such a reader, it is preferred that the bars be printed black on a white background and the the marking indicia and box-like outlines be light red. The hand-encoded markings may be marked with black, blue, green, or purple markers when using a visible red barcode reader but cannot be marked with red, yellow, or orange markers.

The dimensions of the elements of a blank Zodecode symbol are dependent upon the type of programmable barcode reading system being used and the type of application of concern. In a typical application, the narrow bars and spaces of the start and stop codes are no narrower than 0.0075 inches, and the wide bars and spaces in the start and stop codes are three times the width of the narrow bars and spaces. Concerning the digit spaces and digit bars of a blank Zodecode symbol, a typical digit space width is 0.1925 inches, and a typical digit bar width prior to hand-encoding is 0.0075 inches. The height of the elements of a Zodecode symbol are not critical and should only be of a uniform height and of sufficient height to allow the user to make an easy scan track with a hand-held barcode reader and to allow a fixed barcode reader to read the symbol. A typical height for an element is approximately 0.4 inches. The spacing between each data line in a Zodecode label, such as label 60 in FIG. 3B, is also not critical. A distance of approximately 0.1 inch is exemplary.

Figure 6:
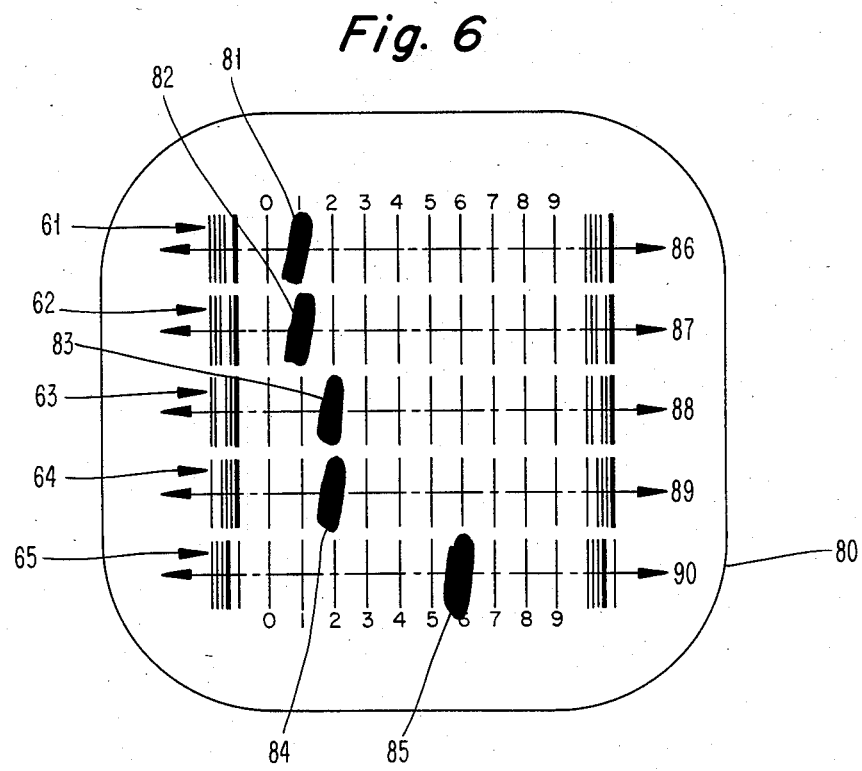
FIG. 6 is a diagrammatic illustration of the blank pre-printed barcode label of FIG. 3B encoded by marks indicating a string of characters representing the number 11226.

FIG. 6 illustrates a blank Zodecode label of the type shown in FIG. 3B which has been hand-encoded by the user. The hand-encoded Zodecode label 80 of FIG. 6 contains the five Zodecode symbols, each having its digit code portion hand-encoded by the user's modifying the desired digit bars. In the encoded Zodecode label 80, the user has hand-encoded the five Zodecode symbols to represent a string of characters, particularly, the number 11226, by modifying a digit bar in each digit code portion. The modified digit bars are illustrated as elements 81, 82, 83, 84, 85 for data lines 61, 62, 63, 64, 65, respectively. In FIG. 6, modified digit bar 81 represents the number "1" and the start/stop codes for data line 61 informs signal processor 26 that the digit "1" will be the first character in the string of characters being decoded by the barcode reading system of the present invention. Similarly, modified digit bar 82 and its associated start/stop code represents the digit "1" and the digit to be the second digit in the string of characters; modified digit bars 83 and 84 each represent the digit "2" and their associated start/stop codes represent the third and fourth positions, respectively, in the string of characters being decoded; and finally, modified digit bar 85 represents the number "6", and the start/stop code of that data line represents that the digit "6" is the fifth and last digit in the string of characters being decoded.

By utilizing the barcode reading system of the present invention, such as system 20 in FIG. 2, a user can scan each data line along its respective scan tracks, for example tracks 86, 87, 88, 89, 90 of Zodecode label 80, of FIG. 6 with barcode reader 24 to detect the elements of each hand-encoded Zodecode symbol of label 80. That detected information is digitized by optical digitizer 27 and transmitted to barcode processor 26. A complete image timing sample is then generated in, stored, and processed by barcode processor 28 as discussed below to decode the start/stop codes and to detect the modified digit bar and decode that information. As with a conventional barcode, the complete image timing sample for a Zodecode symbol is the bar and space time durations of each bar and space detected on the symbol. From the complete image timing sample, the barcode processor can determine, in addition to the width of each element of the read Zodecode symbol, the number of elements and the type of element (bar or space) for the read symbol.

In the preferred embodiment discussed here, the Zodecode label is modified by the user by simply marking one of the ten narrow digit bars of the digit code portion of each Zodecode symbol to transform the narrow digit bar into a wide digit bar. In barcode processor 28, the wide, hand-modified digit bar is then classified as a "1" and the each remaining narrow, unmodified digit bars are classified as a "0". The barcode processor, thus, forms a bar pattern which is easily decodable. Barcode processor 28 does a lookup by comparing the detected bar pattern of the digit code portion with a digit code table stored in signal processor 26. A convenient Zodecode digit code table is illustrated below as Table 2.

TABLE 2

| | DIGIT CODE TABLE (0 = NARROW; 1 = WIDE) | |
|---|---|---|
| | BAR PATTERN | |
| DIGIT CHARACTER | FORWARD DIRECTION | REVERSE DIRECTION |
| 0 | 1 0 0 0 0 0 0 0 0 0 | 0 0 0 0 0 0 0 0 0 1 |
| 1 | 0 1 0 0 0 0 0 0 0 0 | 0 0 0 0 0 0 0 0 1 0 |
| 2 | 0 0 1 0 0 0 0 0 0 0 | 0 0 0 0 0 0 0 1 0 0 |
| 3 | 0 0 0 1 0 0 0 0 0 0 | 0 0 0 0 0 0 1 0 0 0 |
| 4 | 0 0 0 0 1 0 0 0 0 0 | 0 0 0 0 0 1 0 0 0 0 |
| 5 | 0 0 0 0 0 1 0 0 0 0 | 0 0 0 0 1 0 0 0 0 0 |
| 6 | 0 0 0 0 0 0 1 0 0 0 | 0 0 0 1 0 0 0 0 0 0 |
| 7 | 0 0 0 0 0 0 0 1 0 0 | 0 0 1 0 0 0 0 0 0 0 |
| 8 | 0 0 0 0 0 0 0 0 1 0 | 0 1 0 0 0 0 0 0 0 0 |
| 9 | 0 0 0 0 0 0 0 0 0 1 | 1 0 0 0 0 0 0 0 0 0 |

The reverse direction bar pattern for the digit code is shown as is the reverse direction pattern for the start/stop code table (Table 1). As discussed briefly above, barcode processor 28 in conjunction with the start and stop codes and digit codes is designed to support a scanning or reading of each Zodecode symbol in either a forward direction or a reverse direction. For example, the Zodecode symbol hand-encoded for the digit 6 in FIG. 6, that is, data line 65, can be read in the forward direction of the scan track 90 (from left to right) as well as by the reverse direction of the scan track (from right to left). The Zodecode information on that data line will be decoded as the digit "6" for the fifth position in the string of digits regardless of the reading direction.

The unique start/stop codes used in the hand-encoded Zodecode label 80 of FIG. 6 facilitate the reading of each symbol by quickly informing signal processor 26 of the direction of scan and whether a single complete Zodecode symbol has been scanned. Additionally, the unique start/stop codes, in conjunction with the use of the signal processor, eliminate duplicate readings of the same Zodecode symbol or the accidental skipping of one Zodecode symbol when a user attempts to read all the Zodecode symbols on label 80. In the processing of the read encoded label 80, any data line duplication is ignored by the processor in the formulation of the string of characters. Also a missed reading of any of the five Zodecode symbols on the label is detected by the processor and that accidentally skipped Zodecode symbol causes an indication in the signal processor of a bad scan. Additionally, the user need not scan the data lines in any specific order since the processing of the Zodecode symbols properly structures the string of characters regardless of the order of scan as long as all five Zodecode symbols in the hand-encoded label 80 have been successfully scanned.

The unique Zodecode start/stop codes also facilitate another useful aspect of the barcode reading system of the present invention. Barcode reading system 20 in FIG. 2 can read and accurately process not only the hand-encoded Zodecode symbols but also conventional barcode symbols by incorporating an auto-discrimination system in signal processor 26. The start/stop codes of the symbol being read is first detected. If the start/stop code is a Zodecode start/stop code as illustrated in FIG. 6 or as represented in Table 1 the signal processor recognizes the symbol being read as a Zodecode symbol as discussed below. On the other hand, if the detected start/stop code is not a Zodecode start/stop code but rather is a conventional start/stop code, then the signal processor recognizes that the barcode symbol being read is a conventional barcode symbol and processes it according to conventional decoding methods for known barcodes. This auto-discrimination provides greater flexibility for the use of the barcode reading system of the present invention.

Figure 7A:
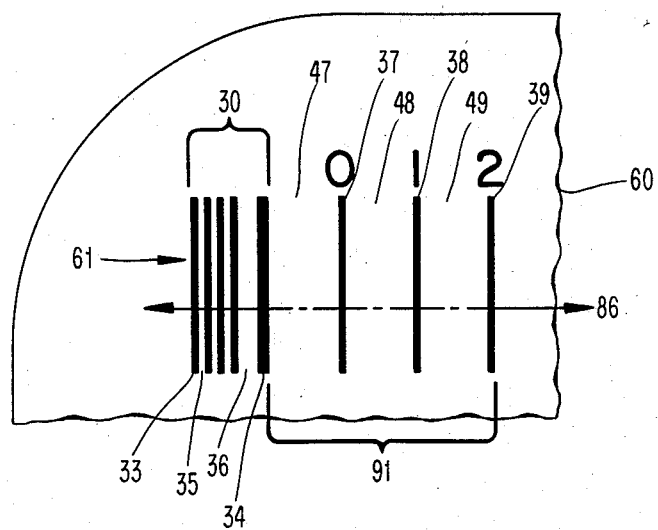
FIG. 7A is enlarged portion of the top data line of the blank pre-printed barcode label of FIG. 3B, and FIGS. 7B–7D illustrate various markings of the digit bar on the enlarged portion representing the digit 1 as a hand-encoded character like that shown in the top portion of FIG. 6.

In FIG. 7A an enlarged portion of one unmarked Zodecode symbol is shown. In particular, FIG. 7A shows the upper left-hand most portion of the blank, pre-printed Zodecode label 60 of FIG. 3B. The portion is part of data line 61 and includes a Zodecode start code with its four narrow bars (one of which is bar 33), one wide bar 34, three narrow spaces (one of which is space 35), and one wide space 36. As shown in Table 1, that start code represents the start/stop character "1" and only that character regardless of the direction of the scan. Also included in FIG. 7A is a portion of an unmarked digit code or digit form 91 showing three digit bars 37, 38, 39 and three digit spaces 47, 48, 49. Scan track 86 is also shown in FIG. 7A. The scan track is not limited to the location illustrated. The only constraint is that the scan track cross all elements of the data line.

Figure 7B:
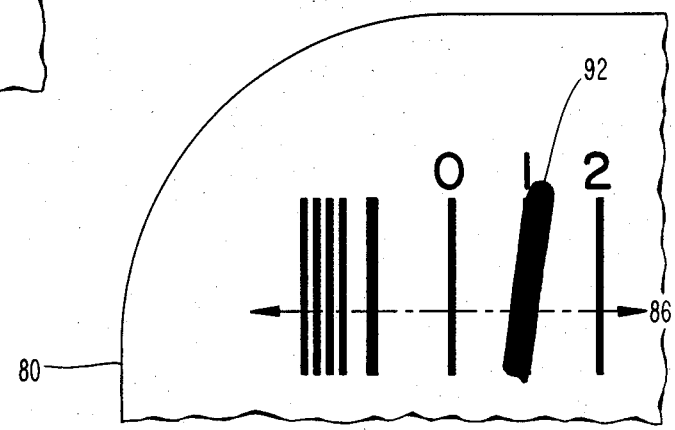
Figure 7C:
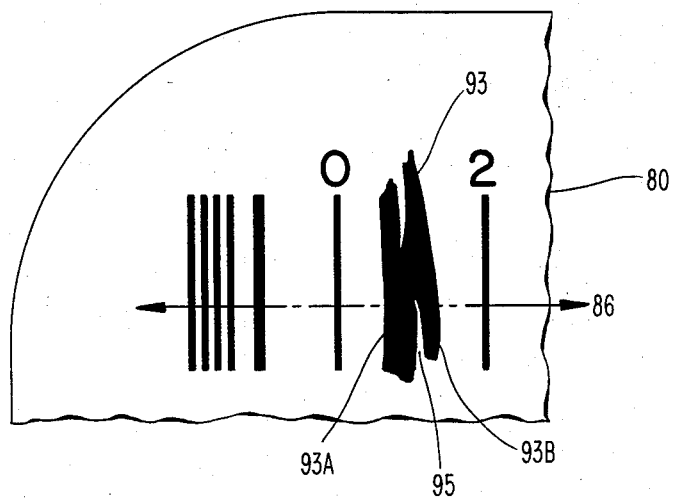
Figure 7D:
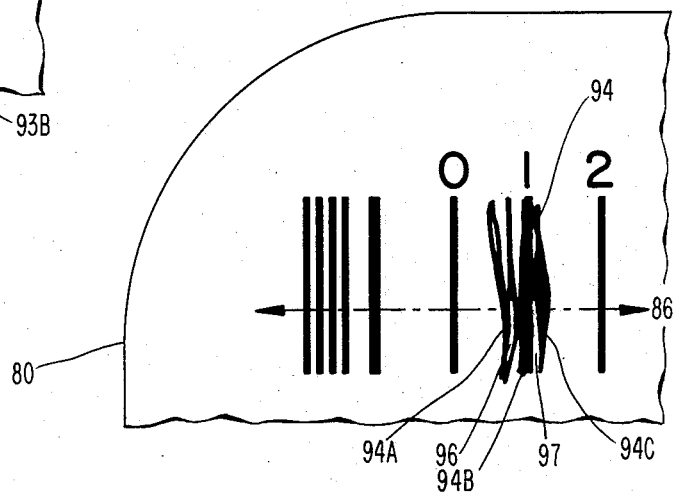

FIG. 7B illustrates the same portion of a Zodecode symbol as shown in FIG. 7A which has been modified by the user to hand-encode the digit "1". The hand-modified digit bar is a good, solid marking as shown as element 92. FIG. 7C shows a variation of the modification of the same digit bar. There marking 93 is more of a scribble than that of the modification by marking 92. FIG. 7D illustrates another variation of the modification of the same digit bar. There marking 94 is more scribbling made by a user using a narrow pointed marking instrument.

Using the process of the present invention, described in detail below, three digit spaces 47, 48, 49 and three digit bars 37, 38, 39 will be detected in the portion of the digit code, that is, portion 91 illustrated in FIG. 7A when the barcode reader 24 travels along scan track 86 in that portion of the digit code. With the good, solid marking 92 of digit bar 36 in FIG. 7B, there are still six elements, that is three spaces and three bars. However, in marking 93 of FIG. 7C the scan will detect a void or unintentional, false space 95 as shown on scan track 86. False space 95 causes the single, desired digit bar 93 to appear as two digit bars 93A, 93B, thus increasing the number of digit bars by one as well as increasing the number of digit spaces by one. Therefore, instead of the desired six elements, there will be eight elements detected, that is, four spaces and four bars. Similarly, in FIG. 7D, with the worst case of scribbling, a reading along scan track 86 will detect two voids or false spaces 96, 97 within marking 94. Those two false spaces cause, in turn, a single marking 94 to appear as three digit bars 94A, 94B, 94C. Therefore, ten elements (five spaces and five bars) will be detected instead of the desired six.

The conventional barcode reading system will fail to read the good, solid marked hand-encoded digit bar shown in FIG. 7B with accuracy. The conventional system will also fail to read accurately the desired digit encoded by the scribblings illustrated as markings 93 and 94 in FIGS. 7C and 7D, respectively. As described below, the process of the present invention correctly detects hand-encoded digit bar markings such as marking 92. Furthermore, the process eliminates the false elements, such as false space 95 in FIG. 7C and false spaces 96, 97 in FIG. 7D. The inventive process consolidates each of the scribblings into a solid bar for accurate decoding in the preferred method discussed below.

Figure 8:
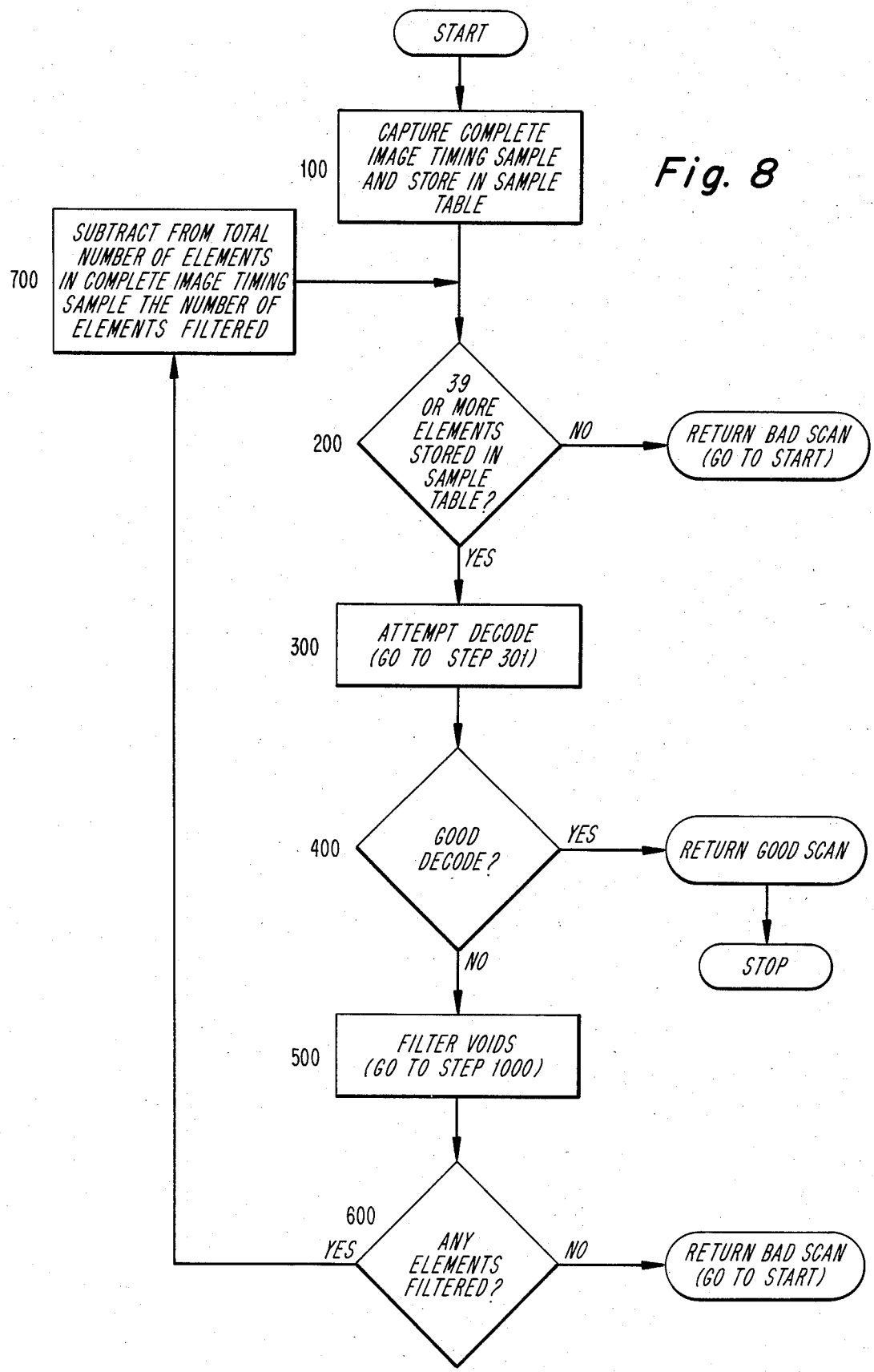
FIG. 8 is a flow chart showing the steps of the method of reading encoded information on a hand-encoded barcode according to a preferred method of the invention.
Figure 9:
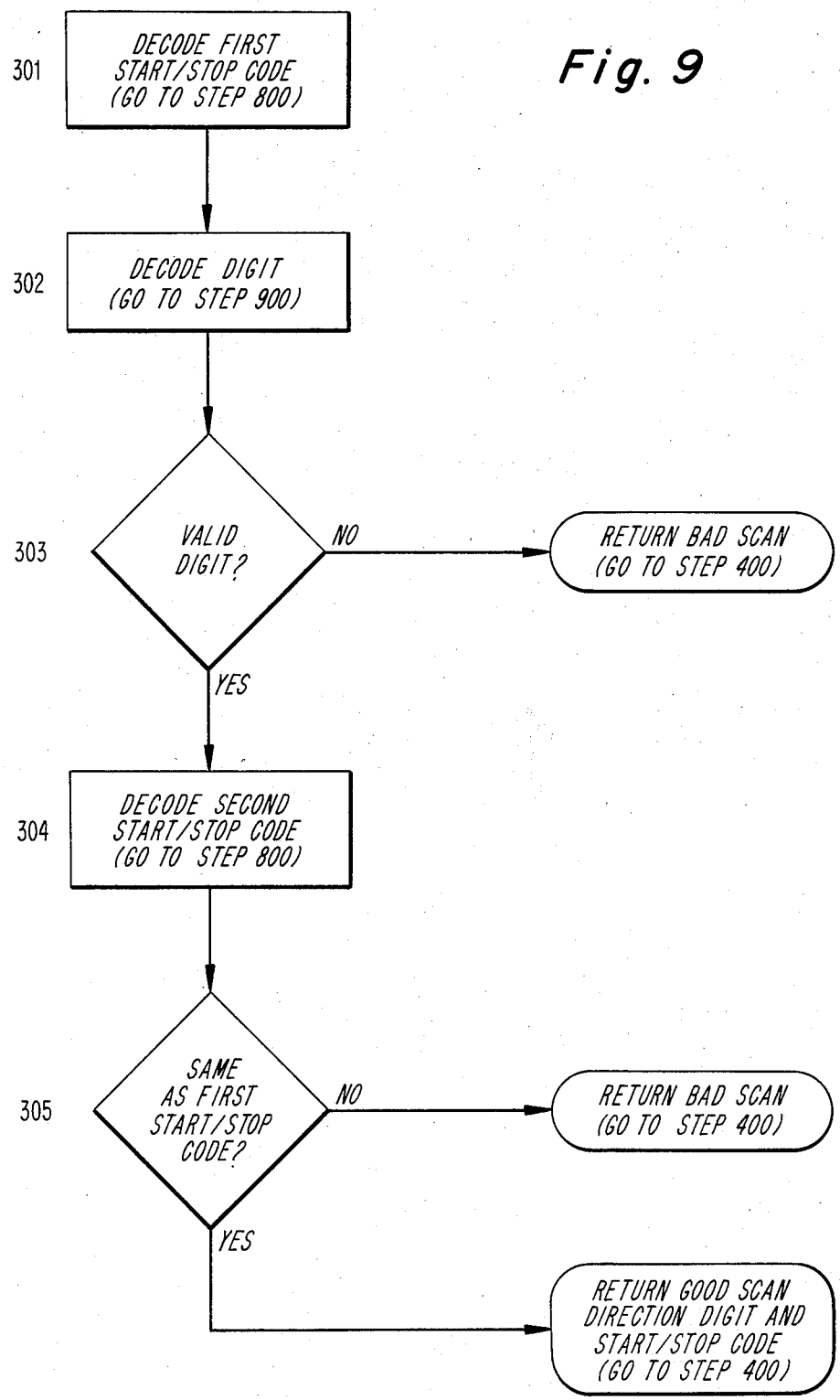
FIG. 9 is a flow chart showing in more detail the steps of the method of the "ATTEMPT DECODE" step in the flow chart of FIG. 8 according to a preferred method of the invention.
Figure 10:
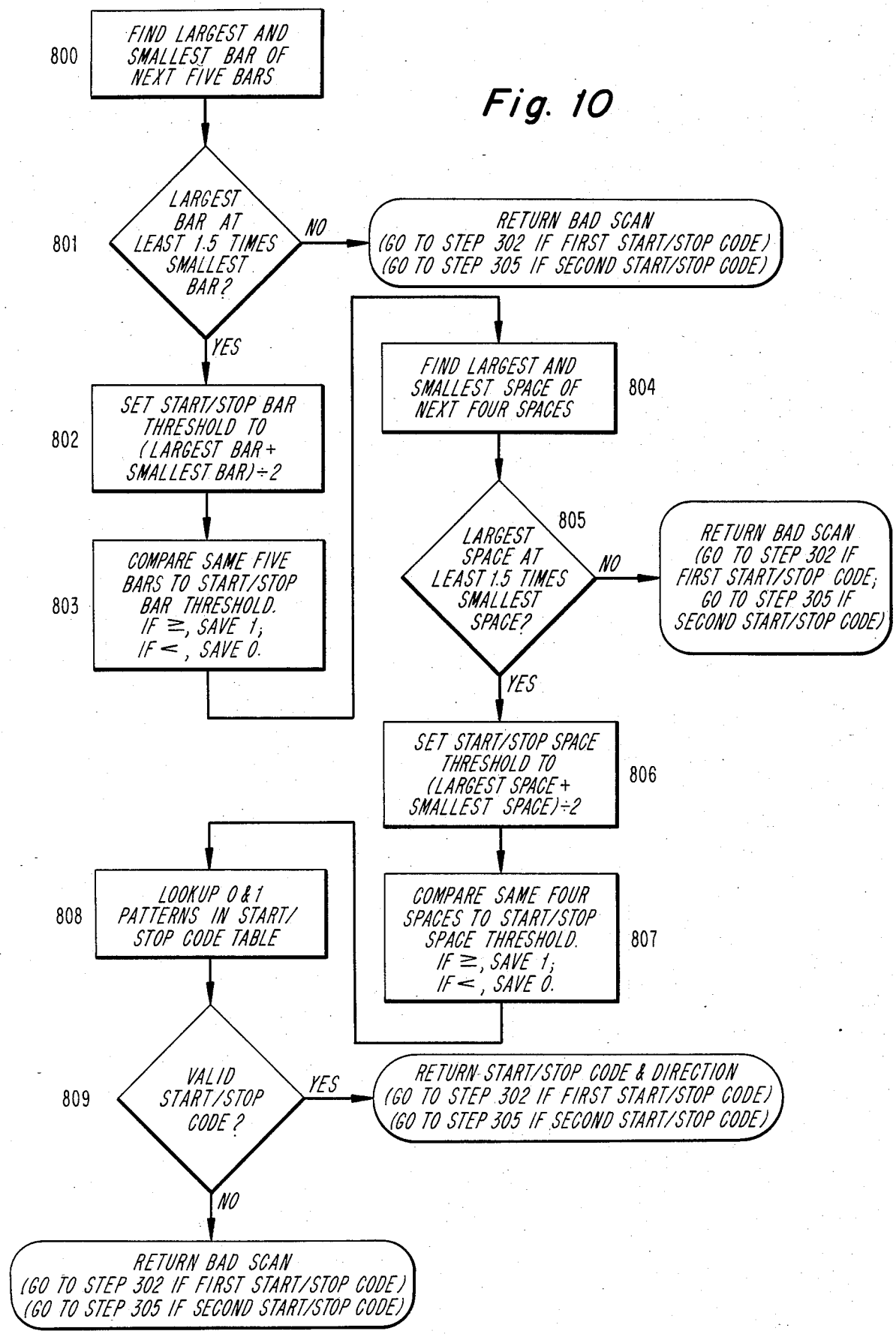
FIG. 10 is a flow chart showing in more detail the steps of the method of the "DECODE FIRST START/STOP CODE" and "DECODE SECOND START/STOP CODE" steps in the flow chart of FIG. 9 according to a preferred method of the invention.
Figure 11:
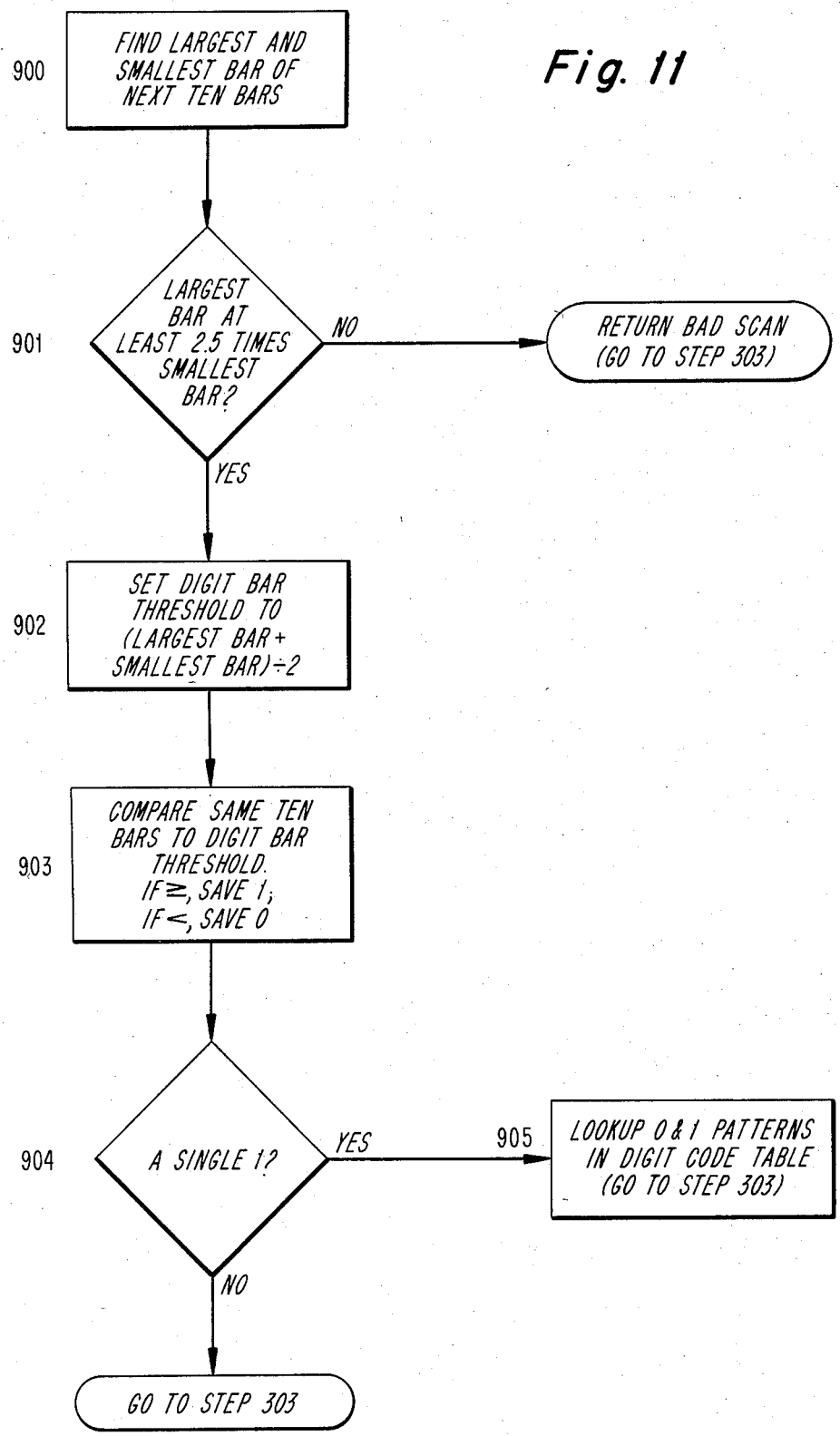
FIG. 11 is a flow chart showing in more detail the steps of the method of the "DECODE DIGIT" step in FIG. 9 according to a preferred method of the invention.
Figure 12:
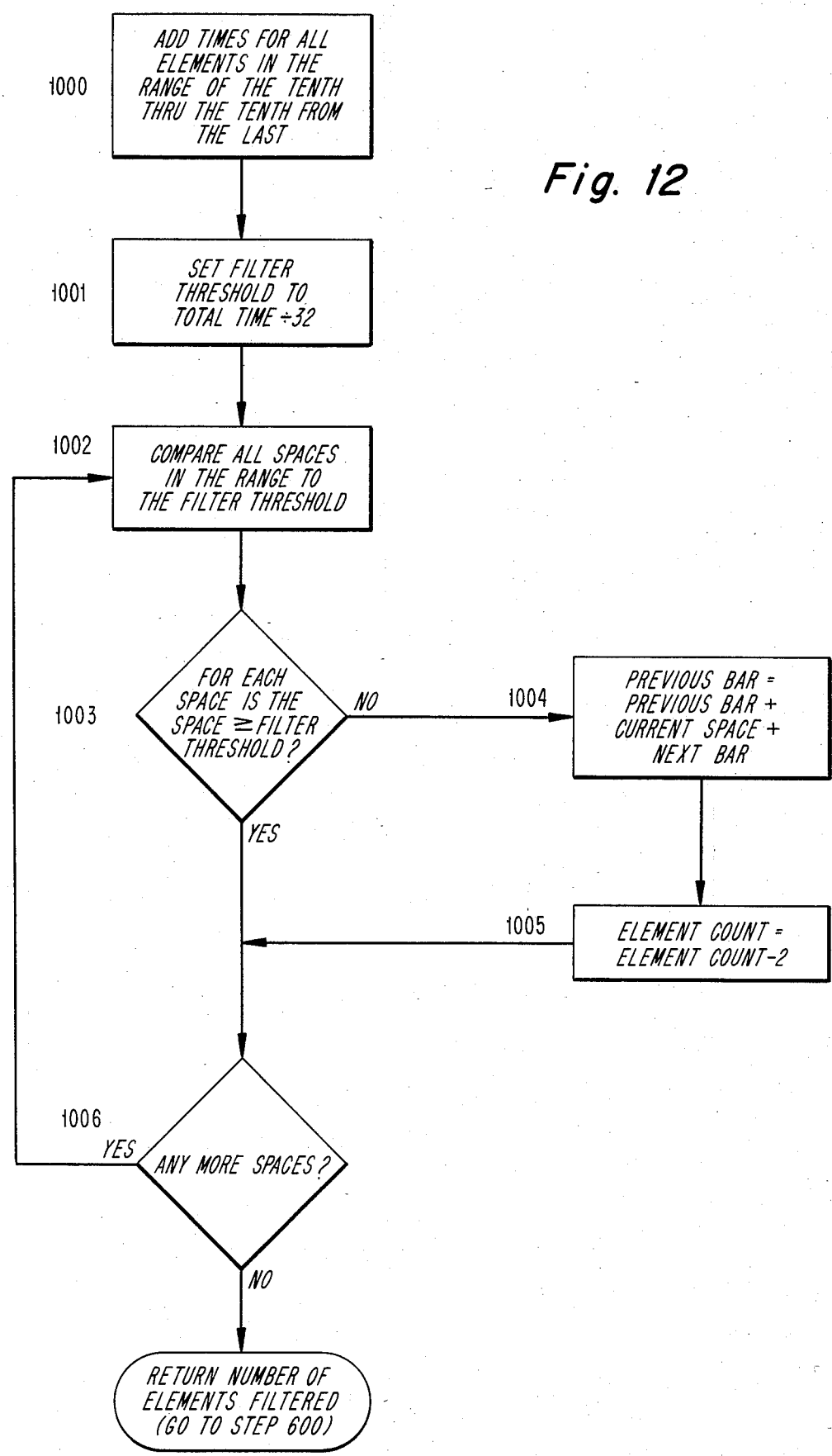
FIG. 12 is a flow chart showing in more detail the steps of the method of the "FILTER VOIDS" step in the flow chart of FIG. 8 according to a preferred method of the invention.

A flow chart of the Zodecode reading process of the preferred method of the present invention is shown in FIGS. 8 through 12. To implement this process, one must merely reprogram a conventional programmable barcode reading system in accordance with the Zodecode reading process. FIG. 8 is a flow chart giving an overview of the entire Zodecode reading process whereas FIGS. 9 through 12 give details of various aspects of the process. Specifically, FIG. 9 is a flow chart of the "ATTEMPT DECODE" step of FIG. 8; FIG. 10 is a flow chart detailing the start/stop code classification of the Zodecode symbol; FIG. 11 is a flow chart of the details of the process of decoding a digit in the digit code portion of the Zodecode symbol; and FIG. 12 is a flow chart of the void filtering process of a preferred method of the present invention.

These flow charts show the process of decoding a single Zodecode symbol which has been hand-encoded for a single character. A person of ordinary skill in the art, after reading this disclosure, can readily implement the present invention to hand-encode and accurately decode a string of characters, such as the digits shown in FIG. 6. Furthermore, as discussed above, a person of ordinary skill in the art can also readily modify the preferred method illustrated in FIGS. 8 through 12 to read a multiplicity of characters in a single Zodecode symbol and to decode accurately into a string of characters a hand-encoded Zodecode label containing more than five Zodecode symbols. Additionally, according to the preferred method of FIGS. 8–12, false spaces are detected and eliminated by the filtering process of FIG. 12; however, false bars can also be detected and eliminated in accordance with the present invention. The preferred method disclosed here and the obvious modifications for various specific applications are readily programmable on available programmable barcode reading systems such as the ones discussed above. Additionally, the process is discussed using the specific embodiment of the present invention illustrated in FIG. 2; however, the process is not limited to that specific apparatus shown. For example, a barcode laser, fixed laser, or other barcode reading device can also be used.

At START, barcode reading system 20 is powered, the circuits and registers are initialized and cleared, and the system is ready to scan the hand-encoded Zodecode label 21 on overnight package 22. (Note that Zodecode label 21 in FIG. 2 is hand-encoded like that illustrated in FIG. 6 with a string of digits 11226 which are readily readable by a human and which, with the process of this invention, are readily machine readable.) Barcode reader 24 is then scanned across each of the five data lines or Zodecode symbols of the label in a manner similar to the reading of a conventional pre-printed, pre-encoded barcode symbol to capture data for forming a complete image timing sample of each symbol. The Zodecode symbol is read and the analog signals generated from the scanning of the elements of the symbol are digitized and fed to the barcode processor. There the digitized data is transformed into a complete image timing sample of the symbol which is stored in a sample table in signal processor 26. As stated above, the complete image timing sample is a reading of the time duration of each element in the read Zodecode symbol, that is, each bar and space in the symbol. Additionally, the complete image timing sample contains data on the number of elements of each symbol and the type of element, that is, bar or space. For a hand-held barcode reader 24 of FIG. 2, the end of valid data can be assumed to be a very large (for example, 50 milliseconds or more) white time (that is, a quiet zone) or black time (that is, the wand off or removed from the label). The capture and store process is STEP 100 in FIG. 8.

At STEP 200, the stored complete image timing sample for the single Zodecode symbol is processed to determine the total number of elements contained in the complete image timing sample. That total number of elements in the complete image timing sample is compared in barcode processor 28 with a desired number of elements for the single Zodecode read symbol. In the preferred embodiment illustrated here, each Zodecode symbol should have 39 elements consisting of five bars and four spaces for the start code, eleven digit spaces and ten digit bars for the digit code portion, and five bars and four spaces for the stop code. Thus, for that embodiment, the desired number of elements is 39. If there are less than 39 elements (twenty bars and nineteen spaces) captured, in STEP 200 a fail is indicated since a complete Zodecode symbol was not read. The barcode processor 28 indicates a bad scan requiring the user to return to START and begin again. If there are 39 or more elements in the complete image timing sample stored in the sample table, barcode processor 28 will attempt to decode the captured complete image timing sample at STEP 300. The details of STEP 300 are discussed below with reference to FIG. 9.

After the decode has been attempted, the barcode processor at STEP 400 determines whether there is a good decode or not. If there is, then the encoded position information from the start code and the hand-encoded character information in the digit code portion of the Zodecode symbol being processed has been successfully and accurately obtained. If not, STEP 500 is initiated to filter false spaces or voids in the digit code portion of the symbol. The details of the void filtering process are discussed in detail with reference to FIG. 12. At STEP 600, barcode processor 28 determines whether any elements have been filtered from the total number of elements in the complete image timing sample. If none have been filtered, a bad scan is indicated and the user must begin again at START. If any elements have been filtered from the total number of elements in the complete image timing sample, that number of elements is subtracted from the number of elements in the captured complete image timing sample at STEP 700. The results of STEP 700 is a filtered complete image timing sample which is processed, as above, beginning at STEP 200.

The details of the attempt decode process (STEP 300) of FIG. 8 are provided in FIG. 9. The process includes decoding the first start or stop code, decoding the hand-encoded digit of the digit code portion of the Zodecode symbol, decoding the second start or stop code, and comparing the first and second start/stop codes to determine whether they are the same code. Specifically, in STEP 301, barcode processor 28 decodes the first start or stop code encountered by barcode reader 24. The details of STEP 301 are shown in FIG. 10 as STEPS 800 through 809. As shown in FIG. 10, the process of start/stop code decoding and classification includes finding the largest and smallest bar of the first five bars of the Zodecode symbol being read (STEP 800). In STEP 801 a determination is made in barcode processor 28 with respect to whether there is an appropriately large (that is, wide) bar. If there is not, then a bad scan is indicated. If there is, the five bars are classified as to whether they are small (that is, narrow) or large, and each is assigned a digital value.

The minimum ratio value between the largest and smallest bar is dependent upon the specific application being undertaken and the apparatus being used. That ratio is utilized to determine if there is a sufficiently wide bar to continue processing of the first start/stop code. In FIG. 10, the value in STEP 801 is set at 1.5; however, other values can be used.

If there is a sufficiently wide bar in the first five bars, then barcode processor 28 sets a start/stop bar threshold in STEP 802 and compares each of the five bars to that start/stop bar threshold to classify the bar as narrow ("0") or as wide ("1"). In the specific method of FIG. 10, the start/stop bar threshold is set as a width half way between the largest and smallest bar width of the five bars. The threshold is obtained by adding the widths of the largest and smallest bar and dividing by a start/stop bar threshold factor of two. Other start/stop bar thresholds, between the largest and smallest bars, can be used; however, the average value is a preferred one.

After the classification of the five bars in STEP 803, a similar process is conducted for the first four spaces of the Zodecode symbol being processed. Specifically, determination is made as to whether there is a sufficiently wide space and then the spaces are classified as wide or narrow (STEPS 804–807). Barcode processor 28 takes the resulting 0,1 pattern of the first start/stop code and does a look-up in the Zodecode start/stop code table (Table 1) to determine if there is a valid start code or a valid reversed stop code (STEPS 808–809). If there is not a valid code, then the bar code processor indicates a bad scan. If there is a valid start/stop code detected, then the barcode processor returns to STEP 302 of FIG. 9 to decode the hand-encoded digit in the digit code portion of the Zodecode symbol. The details of STEP 302 are illustrated in the flow chart of FIG. 11 as STEPS 900 through 905.

To decode the hand-encoded digit, the signal processor classifies the digit bars at the digit code portion of the Zodecode symbol using the same processing technique as that of the start/stop code classification process in FIG. 10. For the preferred method in FIG. 11, in STEP 901 the largest bar to smallest bar minimum ratio of 2.5 is utilized instead of the 1.5 minimum ratio in the start/stop code classification. As with the minimum ratio for the start/stop codes, this 2.5 value can be varied, as needed, depending upon the specific application and apparatus utilized. In STEP 902, a digit bar threshold is obtained in a manner similar to the start/stop bar threshold. The widths of the largest and smallest digit bars are added and then divided by a digit bar threshold factor of two. This, too, can be varied as desired. The ten digit bars are then classified as "1"s (wide) or "0"s (narrow) according to STEP 903.

In STEP 904, a determination is made of the resulting 0,1 patterns to determine if there is a single "1" in the pattern (for the specific application here where a hand encoded single digit for each Zodecode symbol is being used). If there is more than a single "1" in the pattern, the process returns to STEP 303.

If there is a single "1" in the 0,1 pattern, bar processor 28 in STEP 905 performs a look-up of the pattern in the Zodecode digit code table (Table 2) to determine the hand-encoded character. The above process accomplishes the processing of the complete image timing sample of the symbol being read to distinguish the modified digit bar for decoding.

After the look-up in the digit code table at STEP 905, barcode processor 28 returns to STEP 303 in FIG. 9 to determine if a valid, hand-encoded digit has been decoded. If that is not the case, the processor indicates a bad scan. If there was a valid decode, the second start/stop code is decoded at STEP 304. That process is identical to the first start/stop code classification process in STEP 301, and the details are given in FIG. 10 as STEPS 800 through 809. If a valid second start/stop code has been determined in STEP 809, barcode processor 28 returns to STEP 305 in FIG. 9 to compare the first start/stop code with the second start/stop code.

If there is not match of the start and the stop code, then a bad scan is indicated. Most likely, the user began the scan on one data line (that is, in one Zodecode symbol) of hand-encoded label 80 and dropped down or above to another data line and completed the scan so that the start and stop codes do not match. If the first and second start/stop codes match, barcode processor 28 has successfully decoded the single Zodecode symbol establishing the start code number as the encoded position information and the digit number as the encoded character information for the symbol being read.

At that time the barcode processor returns to STEP 400 of FIG. 8. There, if there is a good decode, the scan of the Zodecode symbol is complete. If not, the filter voids processing STEP 500 is initiated, the details of which are presented in the flow chart of FIG. 12. In the filter void process of the invention, the complete image timing sample is processed in barcode processor 28 to identify false elements (such as the void or unintentional, false space 95 in marking 93 of FIG. 7C according to the preferred method in FIG. 12) captured in the complete image timing sample, filtering that false element, and then processing the filtered complete image timing sample to decode the encoded information contained in the remaining elements of the filtered complete image timing sample. In a preferred method of the invention, the false spaces are detected and removed. As discussed above, false bars can also be detected and removed in accordance with the present invention.

As shown in FIG. 12, the filter voids process includes totalling all the times for all the elements in the digit code portion of the Zodecode symbol, that is in the range of the tenth from the first through the tenth from the last element of the entire symbol (STEP 1000). These times or widths of the spaces and bars in the digit code portion of the symbol are readily obtainable from the captured complete image timing sample stored in signal processor 26. This total represents the total amount of time spent in the scan between the start and stop characters of the Zodecode symbol. In STEP 1001, a filter threshold is established to classify which spaces are unintentional, false spaces. In the specific embodiment in FIG. 12, a filter threshold factor of 32 is used to determine the filter threshold. Other filter threshold factors may be considered dependent upon the specific application and apparatus being used. The filter threshold is the total time determined in STEP 1000 divided by the filter threshold factor.

By comparing all of the spaces captured in the complete image timing sample for the digit code portion of the symbol with the filter threshold, the false spaces are detected by the barcode processor. Each space that is less than the filter threshold is eliminated as an element from the complete image timing sample (STEPS 1003–1005). The removal of each false space is achieved by adding in the barcode processor the width of the false space to the width of the bar following the false space and the width of the bar preceding the false space to represent one bar by combining all three elements and then reducing the total number of elements of the complete image timing sample by two. The total elements in the complete image timing sample is reduced by two since the combining process actually eliminates not only the one false space but one false bar for each false space located. This process can be visualized by referring to FIG. 7C where scan track 86 crosses marking 93. As shown, instead of one digit bar for marking 93, there is actually a digit bar 93A, a false space 95, and another digit bar 93B. By combining the width of false space 95 with the portion of the mark 93 to the left of space 95 (bar 93A) as the bar proceeding the false space and combining that space width with the portion of marking 93 to the right of space 95 (bar 93B), three elements (two bars and one space) becomes one bar (that is, the desired digit bar), thus reducing the total number of elements by two. A similar process can eliminate false bars by combining them into their adjacent spaces.

This process of eliminating false spaces is continued by STEP 1006 until all false spaces have been eliminated. Once that is achieved, barcode processor 28 has established the number of elements filtered and returns to process STEP 600 in FIG. 8. As discussed above, if that process determines that no false elements were filtered from the complete image timing sample, then a bad scan is indicated. However, if elements have been filtered, the number of elements filtered is subtracted from the total number of elements in the complete image timing sample in STEP 700 and the decoding process continues on its STEP 200.

With the preferred method illustrated in FIGS. 8 through 12 and its specific threshold factor values and minimum ratio values, false voids are readily eliminated particularly where the voids are larger than the unmodified digit bars. Therefore, a digit bar can be easily hand-encoded by widening it with a variety of marking tools. Preferably, a wider tipped marking instrument, such as a broad tip felt marker, rather than a fine tip pen or pencil is preferred in making the hand-encoded marks so that small voids and small bars are not present. However, small voids created by marking with a fine tip pen, for example, are usually filtered successfully by the above process. The ratio factors and threshold factors can be readily modified as desired and accurate results can be maintained.

Figure 1A:
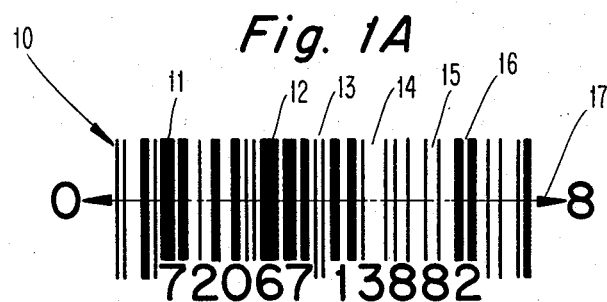
FIGS. 1A and 1B are drawings of an enlarged pre-encoded barcode.
Figure 1B:
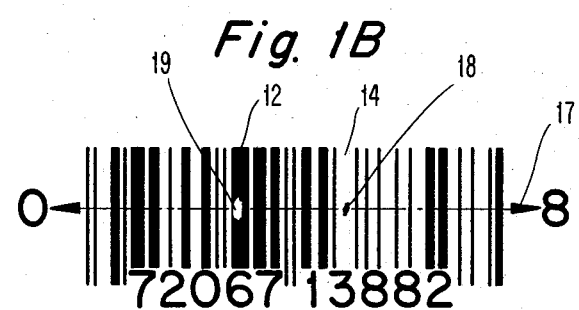

As discussed above the barcode reading system of the present invention can be used to read conventional, pre-encoded barcode formats as well as the hand-encoded Zodecode format with use of the auto-discrimination capability. The filter voids process of this invention can be used in conjunction with conventional pre-encoded barcode format decoding processes to improve the accuracy of such decoding. The inventive process illustrated in FIG. 8 can be modified at STEPS 200 and 300 to decode conventional barcode formats in a known manner. Therefore, reading of the conventional barcodes with the modified process in FIG. 8 with its filter void provisions will reduce false readings due to false spaces or false bars being present in the conventional code. For example, reading the conventional barcode label in FIG. 1B which contains extraneous false space 19 and extraneous false bar 16 along scan track 17 is processed accurately to be read as the desired code shown in FIG. 1A. Thus, the present invention is not limited to Zodecode symbol reading alone.

Figure 13:
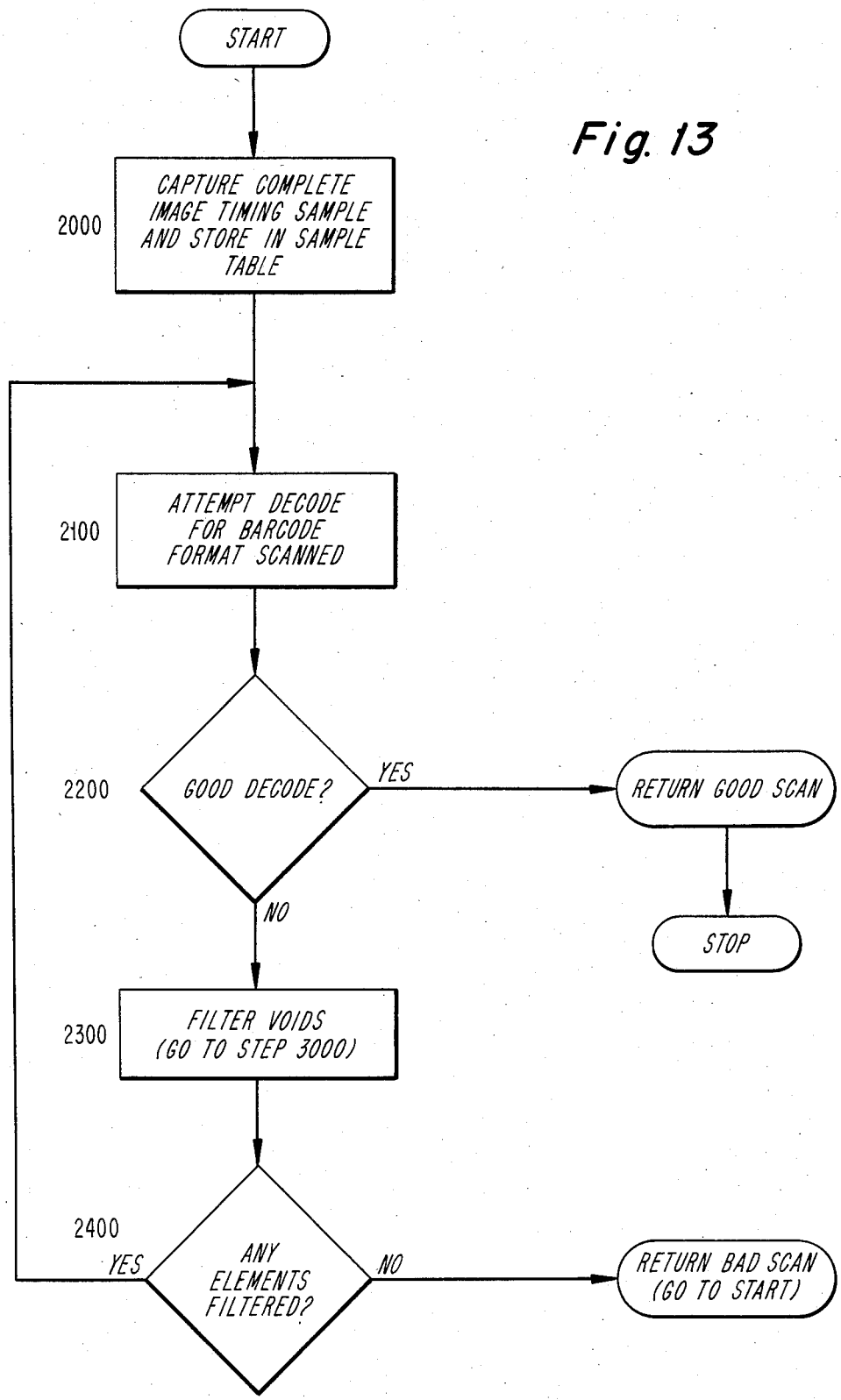
FIG. 13 is a flow chart showing the steps of the method of reading encoded information on a conventional barcode according to a preferred method of the invention.
Figure 14:
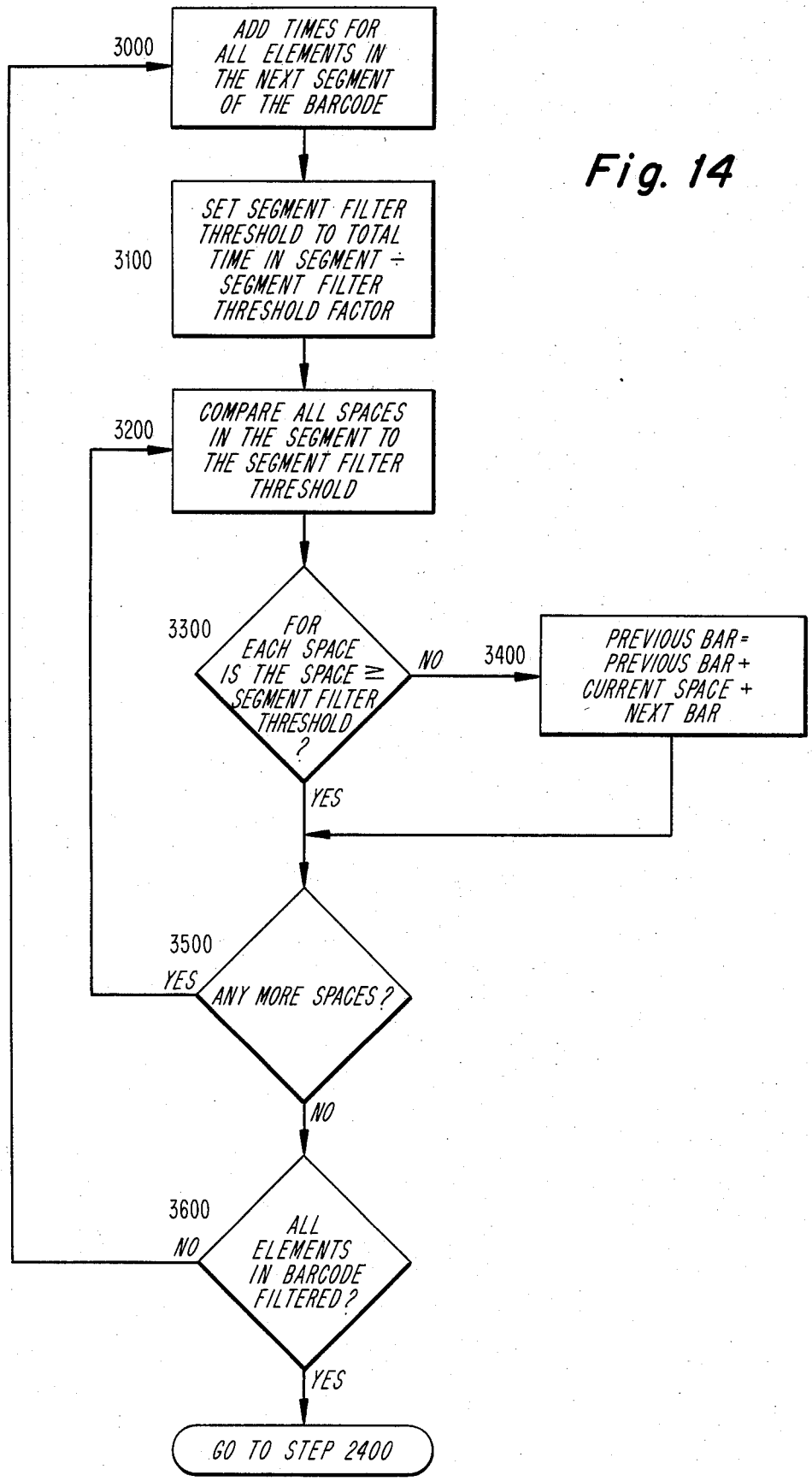
FIG. 14 is a flow chart showing in more detail the steps of the method of the "FILTER VOIDS" step in the flow chart of FIG. 13 according to a preferred method of the invention.

FIGS. 13 and 14 represent FIGS. 8 and 12 modified to illustrate a preferred method of the invention as used in the reading of a conventional barcode. Since the number of elements in a conventional barcode varies with the barcode format being used and with the information encoded on the barcode, there is no one expected or desired number of elements for all of the pre-encoded barcode symbols as there is with a Zodecode symbol. Thus, the filtering process of the invention for conventional barcodes is modified slightly to accommodate the varying number of elements. A preferred method of the modified process is shown in FIG. 14 and discussed below. Additionally, as well known, STEP 2100 of FIG. 13 includes a determination with respect to whether a sufficient number of elements has been detected by the barcode reader to indicate that a full barcode has been read. If a sufficient number of elements has been detected, it is possible that a valid barcode has been scanned, and an attempt to decode the read symbol is made in a conventional manner. An insufficient number of elements detected indicates that a full barcode was not read; thus, the process is reinitialized to START.

Upon the completion of STEP 2100, a determination is made of the results of the attempted decode (STEP 2200). If a good decode is made, the process is completed. If not, the filtering process is initiated at STEP 2300 of FIG. 13 to eliminate false elements from the scanned barcode. The details of a preferred filtering process are shown in FIG. 14.

The filtering process for conventional barcodes includes dividing the complete image timing sample representing the read barcode into segments and processing the elements of each segment to detect and eliminate false elements in each segment in a manner like that of the filtering process for Zodecode symbols. A typical segment includes sixteen elements of the read barcode. In STEP 3000, the times or widths of the detected bars and spaces in the segment are totalled. Dividing the total with a filter threshold factor for the segment creates a filter threshold for the segment (STEP 3100). The threshold factor depends on the size (that is, number of elements) of the segment being processed and is automatically adjusted according to the segment size. Preferably, the ratio of the number of elements in a segment to the threshold factor remain a constant, for example two. In a preferred method, for a sixteen element segment the segment filter threshold factor is eight. If eight elements make up a segment, the threshold factor would be four.

Except for the elimination of STEP 1005 which is not necessary in the barcode filtering process of FIG. 14, STEPS 3200–3500 are the same as STEPS 1002–1006 of FIG. 12. Those STEPS serve to filter false spaces in the segment being processed by combining them with adjacent bars. As with the Zodecode filtering, false bars as well as false spaces can be eliminated from the read barcode. These STEPS are continued until all false spaces are eliminated from the segment (STEP 3500). The process continues onto the next segment of the barcode at STEP 3600 and cycles until all segments of the barcode have been filtered. Once all segments and, thus, all elements in the barcode have been filtered, the process, according to the preferred method illustrated in FIG. 14, returns to STEP 2400 of FIG. 13.

It will be apparent to those skilled in the art that various modifications and variations can be made in the method and system of reading encoded information from a barcode of the present invention without departing from the scope or spirit of the invention. For example, as discussed above, the number of characters per Zodecode symbol can be different from the specific embodiment discussed here. Additionally, the digit code portion or digit form of the Zodecode symbol can consist of any of a variety of numbers of digit bars and the hand-encoding can be accomplished by marking the desired space or spaces between the digit bars instead of the digit bars themselves. For example, a Zodecode symbol that can be read accurately by the method and system of the present invention can have a digit form with eleven digit bars where the ten spaces between the pairs of digit bars represent ten characters. Each space can include marking indicia, invisible to the barcode reader, representing the character to be encoded to aid in the hand-encoding of the symbol and human reading of the hand-encoded symbol. The Zodecode symbol is modified by the user by simply marking the space containing the character which is to be encoded. By the process of the invention that marking transforms the two adjacent narrow digit bars into one wide digit bar which is accurately decoded. The hand-encoding is also not limited to marking with pens or pencils but can be accomplished by a rubber stamp, typewriter, or computer printer for encoding the desired character. Furthermore, false bars as well as false voids can be filtered in accordance with the invention. Thus, it is intended that the present invention covers the modifications and variations of this invention provided they come within the scope of the appended claims and their equivalents.

What is claimed is:

1. A method for reading encoded information from a barcode wherein the barcode includes bars and spaces comprising the elements of the barcode and each bar and space has a width, the method comprising the steps of:
   reading the barcode using a barcode reader to capture data for forming a complete image timing sample of the barcode;
   generating in a barcode processor the complete image timing sample from the data captured by the barcode reader, the complete image timing sample representing the read barcode including the number of elements in the barcode, whether the element is a space or a bar, and the width of each element; and
   processing the complete image timing sample in the barcode processor, the processing step including the substeps of
   identifying false elements in the complete image timing sample,
   filtering the false elements from the complete image timing sample, and
   processing the filtered complete image timing sample to decode the encoded information contained in the elements of the filtered complete image timing sample.

2. The method of claim 1 in which the substep of filtering the false elements from the complete image timing sample, each false element having a width, includes the following steps for each false element:
   identifying in the barcode processor the element preceding the false element, the preceding element having a width;
   identifying in the barcode processor the element following the false element, the following element having a width; and
   combining in the barcode processor the width of the false element with the width of the preceding element and the width of the following element, thereby eliminating the false element by transforming it into a portion of the elements preceding and following the false element.

3. The method of claim 1 in which the substep of identifying false elements in the complete image timing sample, each false element having a width, further includes the steps of:
   dividing the complete image timing sample into segments;
   setting a filter threshold in the barcode processor for each segment of the complete image timing sample;
   for each complete image timing sample segment comparing in the barcode processor the width of each element in the complete image timing sample segment with the filter threshold for that segment; and
   identifying as a false element each element in the complete image timing sample segment having a width less than the filter threshold for that segment.

4. The method of claim 3 in which the step of setting the filter threshold for each segment includes the steps of:
   determining in the barcode processor the total width of all the elements in the complete image timing sample segment; and
   dividing the total width by a filter threshold factor for that segment.

5. The method of claim 1 in which the substep of identifying false elements in the complete image timing sample includes the step of determining in the barcode processor the false spaces in the complete image timing sample; and in which the substep of filtering the false elements from the complete image timing sample includes the substep of filtering in the barcode processor the false spaces from the complete image timing sample.

6. The method of claim 1 in which the substep of identifying false elements in the complete image timing sample includes the step of determining in the barcode processor the false bars in the complete image timing sample; and in which the substep of filtering the false elements from the complete image timing sample includes the substep of filtering in the barcode processor the false bars from the complete image timing sample.

7. A method for entering information into a processor using a barcode, wherein the barcode includes bars and spaces comprising the elements of the barcode and each bar and space has a width and wherein the barcode contains a pre-printed form composed of a digit code having digit bars and digit spaces, the method comprising the steps of:
  modifying a digit bar of the digit code to represent a portion of the information to be entered;
  reading the barcode with the modified digit bar using a barcode reader to capture data for forming a complete image timing sample of the barcode;
  generating in a barcode processor the complete image timing sample from the data captured by the barcode reader, the complete image timing sample representing the read barcode including the number of elements in the barcode, whether the element is a space or a bar, and the width of each element;
  determining in the barcode processor a total number of elements in the complete image timing sample;
  comparing in the barcode processor the total number of elements in the complete image timing sample with a desired number of elements for the barcode;
  processing the complete image timing sample in the barcode processor to detect the modified digit bar and decode the information contained in the elements of the complete image timing sample if the number of elements in the complete image timing sample equals the desired number; and
  processing the complete image timing sample in the barcode processor if the number of elements in the complete image timing sample is greater than the desired number, the processing step including the substeps of
    identifying false elements in the complete image timing sample,
    filtering the false elements from the complete image timing sample, and
    processing the filtered complete image timing sample to detect the modified digit bar and decode the information contained in the elements of the filtered complete image timing sample.

8. The method of claim 7 in which the substep of filtering the false elements from the complete image timing sample, each false element having a width, includes the following steps for each false element:
  identifying in the barcode processor the element preceding the false element, the preceding element having a width;
  identifying in the barcode processor the element following the false element, the following element having a width;
  combining in the barcode processor the width of the false element with the width of the preceding element and the width of the following element, thereby eliminating the false element by transforming it into a portion of the elements preceding and following the false element; and
  reducing the total number of elements of the complete image timing sample by two.

9. The method of claim 7 in which the substep of identifying the false elements in the complete image timing sample, each false element having a width, further includes the steps of:
  setting a filter threshold in the barcode processor;
  comparing in the barcode processor the width of each element in the complete image timing sample representing the digit code of the barcode with the filter threshold; and
  identifying in the complete image timing sample as a false element each element having a width less than the filter threshold.

10. The method of claim 9 in which the step of setting the filter threshold includes the steps of:
  determining in the barcode processor the total width of all the elements in the digit code; and
  dividing the total width by a filter threshold factor.

11. The method of claim 7 in which the substep of identifying the false elements in the complete image timing sample includes the step of determining in the barcode processor the false spaces in the complete image timing sample; and in which the substep of filtering the false elements from the complete image timing sample includes the substep of filtering in the barcode processor the false spaces from the complete image timing sample.

12. The method of claim 7 in which the substep of identifying the false elements in the complete image timing sample includes the step of determining in the barcode processor the false bars in the complete image timing sample; and in which the substep of filtering the false elements from the complete image timing sample includes the substep of filtering in the barcode processor the false bars from the complete image timing sample.

13. The method of claim 7 in which the step of modifying a digit bar includes the step of hand-marking the digit bar.

14. The method of claim 7 in which the step of modifying a digit bar includes the step of widening the digit bar into a wider digit bar by marking the digit bar.

15. The method of claim 7 in which the step of detecting the modified digit bar further includes the steps of:
  setting a digit bar threshold in the barcode processor;
  comparing in the barcode processor the width of each bar in the complete image timing sample representing the digit code of the barcode with the digit bar threshold; and
  identifying in the complete image timing sample representing the digit code as a modified digit bar each digit bar having a width greater than the digit bar threshold.

16. The method of claim 15 in which the step of setting the digit bar threshold includes the steps of:
  determining in the barcode processor the largest width of the digit bars and the smallest width of the digit bars; and
  choosing as the set digit bar threshold a value between the width of the largest and smallest digit bars.

17. The method of claim 16 in which the step of choosing the value of the set digit bar threshold includes the substeps of:
  adding the largest and smallest widths of the digit bars; and
  dividing the sum of the largest and smallest digit bars by a digit threshold factor.

18. The method of claim 7, in which the barcode includes a start code and a stop code, and the digit code is located between the start and stop codes, further comprising the steps of:
  decoding the start code in the barcode processor;
  decoding the digit code in the barcode processor;
  decoding the stop code in the barcode processor;
  comparing in the barcode processor the start code with the stop code; and
  producing the decoded information from the digit code if the start code and stop code match.

19. The method of claim 18 in which the step of decoding the digit code further comprises the steps of:

digitizing in the barcode processor a portion of the complete image timing sample representing the digit code of the barcode; and comparing the digitized portion of the complete image timing sample with a table stored in the barcode processor to identify the information encoded on the barcode.

20. A method for reading an encoded string of characters from a plurality of barcodes arranged in a regular order, each barcode including encoded information representing an encoded character in the string of characters, the method comprising the steps of:

reading with a barcode reader each of the plurality of barcodes;

transmitting the read barcodes to a barcode processor;

extracting encoded position information from each read barcode using the barcode processor, the encoded position information representing a position within the string of characters being decoded of the character encoded in the corresponding barcode;

extracting encoded character information from each read barcode using the barcode processor and decoding a character from the encoded character information; and generating, using the barcode processor, a decoded string of characters from the extracted position information and decoded characters of the read barcodes.

21. A barcode label for encoding a multi-character string readable by a barcode reader, the label comprising:

a plurality of data lines;

barcode readable start and stop codes unique to each data line; and a barcode readable digit form located between the start code and the stop code of each data line.

22. The barcode label of claim 21 in which the start code of a data line is identical to the stop code of that data line.

23. The barcode label of claim 21 wherein the digit form includes a plurality of digit bars and digit spaces, each digit space being wider than a digit bar and each digit bar being bounded on each side by a digit space.

24. The barcode label of claim 23 wherein the start, stop, and digit bars are pre-printed indicia on the barcode label.

25. A system for entering into a processor a character marked by hand, the system comprising:

a pre-printed barcode form containing a plurality of bars and spaces representing the elements of a character code, of which at least one of the bars is designed to be modified by hand to represent the character;

barcode reader means for scanning the barcode form with the at least one modified bar and capturing data for forming a complete image timing sample representing the bars, spaces, and at least one modified bar, wherein the complete image timing sample includes the number and width of the bars, spaces, and at least one modified bar; and means, coupled to the barcode reader means, for generating from data captured by the barcode reader means the complete image timing sample representing the scanned barcode, as modified, and for processing it to distinguish modified bars from unmodified bars and for decoding the modified bars into corresponding characters.

26. The system of claim 25 in which the processing means includes:

means for determining a total number of elements in the complete image timing sample, comparing the total number of elements in the complete image timing sample with a desired number of elements, detecting any false elements in the complete image timing sample, filtering from the complete image timing sample the false elements, and decoding the elements of the filtered complete image timing sample to obtain the character.

27. The system of claim 26 in which the means for detecting and filtering the false elements includes means for determining false bars in the complete image timing sample and filtering the false bars from the complete image timing sample.

28. The system of claim 26 in which the means for detecting and filtering the false elements includes means for determining false spaces in the complete image timing sample and filtering the false spaces from the complete image timing sample.

29. The system of claim 28 in which the means for detecting and filtering the false spaces in the complete image timing sample further includes means for setting a filter threshold, comparing the width of each space in the complete image timing sample with the filter threshold, and identifying in the complete image timing sample as a false space each space having a width less than the filter threshold.

30. The system of claim 26 in which the means for filtering the false elements from the complete image timing sample further includes means for adding the width of the false element to the width of the element following the false element and the width of the element preceding the false space element and reducing the total number of elements of the complete image timing sample by two for each combination.

* * * * *